(12) United States Patent
Lindenmeier

(10) Patent No.: US 7,936,852 B2
(45) Date of Patent: May 3, 2011

(54) ANTENNA DIVERSITY SYSTEM FOR RADIO RECEPTION FOR MOTOR VEHICLES

(75) Inventor: Heinz Lindenmeier, Pianegg (DE)

(73) Assignee: Delphi Delco Electronics Europe GmbH, Wuppertal (DE)

( * ) Notice: Subject to any disclaimer, the term of this patent is extended or adjusted under 35 U.S.C. 154(b) by 1268 days.

(21) Appl. No.: 11/531,039

(22) Filed: Sep. 12, 2006

(65) Prior Publication Data
US 2007/0058761 A1 Mar. 15, 2007

(30) Foreign Application Priority Data

Sep. 12, 2005 (DE) .......................... 10 2005 043 304
Aug. 21, 2006 (DE) .......................... 10 2006 039 357

(51) Int. Cl.
*H04B 7/10* (2006.01)
*H04L 1/02* (2006.01)

(52) U.S. Cl. ........ 375/347; 343/713; 343/711; 343/715; 343/704; 455/276.1; 455/277.2; 455/297; 455/273; 342/374; 342/448; 342/433

(58) Field of Classification Search ........................ None
See application file for complete search history.

(56) References Cited

U.S. PATENT DOCUMENTS

| | | | |
|---|---|---|---|
| 3,942,119 A | 3/1976 | Meinke et al. | |
| 4,057,758 A * | 11/1977 | Hattori et al. | ................. 375/267 |
| 4,070,677 A | 1/1978 | Meinke et al. | |
| 4,095,228 A | 6/1978 | Meinke et al. | |
| 4,602,260 A | 7/1986 | Lindenmeier et al. | |
| 4,752,968 A | 6/1988 | Lindenmeier et al. | |
| 4,791,426 A | 12/1988 | Lindenmeier et al. | |
| 4,914,446 A | 4/1990 | Lindenmeier et al. | |
| 5,029,308 A | 7/1991 | Lindenmeier et al. | |
| 5,049,892 A | 9/1991 | Lindenmeier et al. | |
| 5,097,270 A | 3/1992 | Lindenmeier et al. | |
| 5,138,330 A | 8/1992 | Lindenmeier et al. | |
| 5,266,960 A | 11/1993 | Lindenmeier et al. | |
| 5,289,197 A | 2/1994 | Lindenmeier et al. | |
| 5,313,660 A | 5/1994 | Lindenmeier et al. | |

(Continued)

FOREIGN PATENT DOCUMENTS

DE 196 07 045 8/1997

(Continued)

OTHER PUBLICATIONS

H. Lindenmeier et al., SAE Technical Paper Series 981147 (ISSN0148-7191) Diversity Effectiveness.

(Continued)

*Primary Examiner* — Shuwang Liu
*Assistant Examiner* — Gina McKie
(74) *Attorney, Agent, or Firm* — Thomas N. Twomey

(57) ABSTRACT

An antenna diversity system for radio reception for motor vehicles, which comprises a multi-antenna system having several antennas with antenna feed lines. There can be a diversity switching device for selection of a different reception signal, and an evaluation circuit which evaluates the reception quality of the reception signal just arriving at the receiver. This evaluation circuit is designed to bring a different reception signal in terms of diversity to the receiver if interference occurs, by switching over. This design also includes at least one phase rotation device which is disposed along at least one of the signal paths.

25 Claims, 22 Drawing Sheets

U.S. PATENT DOCUMENTS

| | | | |
|---|---|---|---|
| 5,589,839 A | 12/1996 | Lindenmeier et al. | |
| 5,619,214 A | 4/1997 | Lindenmeier et al. | |
| 5,719,585 A * | 2/1998 | Tabata et al. | 343/713 |
| 5,801,663 A | 9/1998 | Lindenmeier et al. | |
| 5,818,394 A | 10/1998 | Aminzadeh et al. | |
| 5,826,179 A | 10/1998 | Lindenmeier et al. | |
| 5,850,198 A | 12/1998 | Lindenmeier et al. | |
| 5,905,469 A | 5/1999 | Lindenmeier et al. | |
| 5,926,141 A | 7/1999 | Lindenmeier et al. | |
| 5,929,812 A | 7/1999 | Aminzadeh | |
| 5,949,498 A | 9/1999 | Rudolph | |
| 5,973,648 A | 10/1999 | Lindenmeier et al. | |
| 6,011,962 A | 1/2000 | Lindenmeier et al. | |
| 6,123,550 A | 9/2000 | Burkert et al. | |
| 6,130,645 A | 10/2000 | Lindenmeier et al. | |
| 6,140,969 A | 10/2000 | Lindenmeier et al. | |
| 6,169,888 B1 | 1/2001 | Lindenmeier et al. | |
| 6,184,837 B1 | 2/2001 | Lindenmeier et al. | |
| 6,188,447 B1 | 2/2001 | Rudolph et al. | |
| 6,208,303 B1 * | 3/2001 | Tachihara et al. | 343/704 |
| 6,218,997 B1 | 4/2001 | Lindenmeier et al. | |
| 6,236,372 B1 | 5/2001 | Lindenmeier et al. | |
| 6,313,799 B1 | 11/2001 | Thimm et al. | |
| 6,317,096 B1 | 11/2001 | Daginnus et al. | |
| 6,377,221 B1 | 4/2002 | Lindenmeier et al. | |
| 6,400,334 B1 | 6/2002 | Lindenmeier et al. | |
| 6,421,532 B1 | 7/2002 | Lindenmeier et al. | |
| 6,430,404 B1 * | 8/2002 | Lindenmeier et al. | 455/132 |
| 6,574,460 B1 | 6/2003 | Lindenmeier et al. | |
| 6,603,434 B2 | 8/2003 | Lindenmeier et al. | |
| 6,603,435 B2 | 8/2003 | Lindenmeier et al. | |
| 6,611,677 B1 | 8/2003 | Lindenmeier et al. | |
| 6,633,258 B2 | 10/2003 | Lindenmeier et al. | |
| 6,653,982 B2 | 11/2003 | Lindenmeier et al. | |
| 6,731,921 B1 * | 5/2004 | Militz et al. | 455/277.2 |
| 6,768,457 B2 | 7/2004 | Lindenmeier | |
| 6,888,508 B2 | 5/2005 | Lindenmeier | |
| 6,911,946 B2 | 6/2005 | Lindenmeier | |
| 6,917,340 B2 | 7/2005 | Lindenmeier | |
| 6,925,293 B2 | 8/2005 | Lindenmeier et al. | |
| 6,927,735 B2 | 8/2005 | Lindenmeier et al. | |
| 6,956,533 B2 | 10/2005 | Lindenmeier | |
| 7,127,218 B2 | 10/2006 | Lindenmeier | |
| 7,403,167 B2 | 7/2008 | Probst et al. | |
| 7,469,024 B2 * | 12/2008 | Khayrallah et al. | 375/347 |
| 7,555,277 B2 | 6/2009 | Lindenmeier et al. | |
| 7,564,416 B2 | 7/2009 | Lindenmeier et al. | |
| 7,702,051 B2 | 4/2010 | Lindenmeier et al. | |
| 2001/0016478 A1 | 8/2001 | Lindenmeier et al. | |
| 2002/0025793 A1 * | 2/2002 | Meijer et al. | 455/277.1 |
| 2002/0118138 A1 | 8/2002 | Lindenmeier et al. | |
| 2002/0126055 A1 * | 9/2002 | Lindenmeier et al. | 343/713 |
| 2002/0154059 A1 | 10/2002 | Lindenmeier | |
| 2002/0171600 A1 | 11/2002 | Lindenmeier et al. | |
| 2002/0196183 A1 | 12/2002 | Lindenmeier | |
| 2003/0164802 A1 | 9/2003 | Lindenmeier | |
| 2004/0113854 A1 * | 6/2004 | Lindenmeier | 343/713 |
| 2004/0130496 A1 * | 7/2004 | Iijima et al. | 343/713 |
| 2004/0160373 A1 | 8/2004 | Lindenmeier | |
| 2004/0164912 A1 | 8/2004 | Lindenmeier et al. | |
| 2004/0183737 A1 | 9/2004 | Lindenmeier | |
| 2004/0198274 A1 | 10/2004 | Lindenmeier | |
| 2005/0107045 A1 * | 5/2005 | Kroeger | 455/83 |
| 2006/0082494 A1 | 4/2006 | Deininger et al. | |
| 2006/0114146 A1 | 6/2006 | Lindenmeier et al. | |
| 2006/0182201 A1 | 8/2006 | Lindenmeier et al. | |
| 2007/0140389 A1 | 6/2007 | Lindenmeier et al. | |
| 2008/0026705 A1 * | 1/2008 | Asami | 455/99 |
| 2008/0218422 A1 | 9/2008 | Lindenmeier et al. | |
| 2008/0248770 A1 | 10/2008 | Schultz et al. | |
| 2008/0260079 A1 | 10/2008 | Lindenmeier et al. | |
| 2009/0036074 A1 | 2/2009 | Lindenmeier et al. | |
| 2009/0042529 A1 | 2/2009 | Lindenmeier et al. | |
| 2009/0073072 A1 | 3/2009 | Lindenmeier et al. | |
| 2010/0066618 A1 | 3/2010 | Heuer | |

FOREIGN PATENT DOCUMENTS

EP  1 126 631  8/2001

OTHER PUBLICATIONS

U.S. Appl. No. 12/689,969 filed Jan. 19, 2010.
U.S. Appl. No. 12/716,318 filed Mar. 3, 2010.
U.S. Appl. No. 12/786,236 filed May 24, 2010.

* cited by examiner

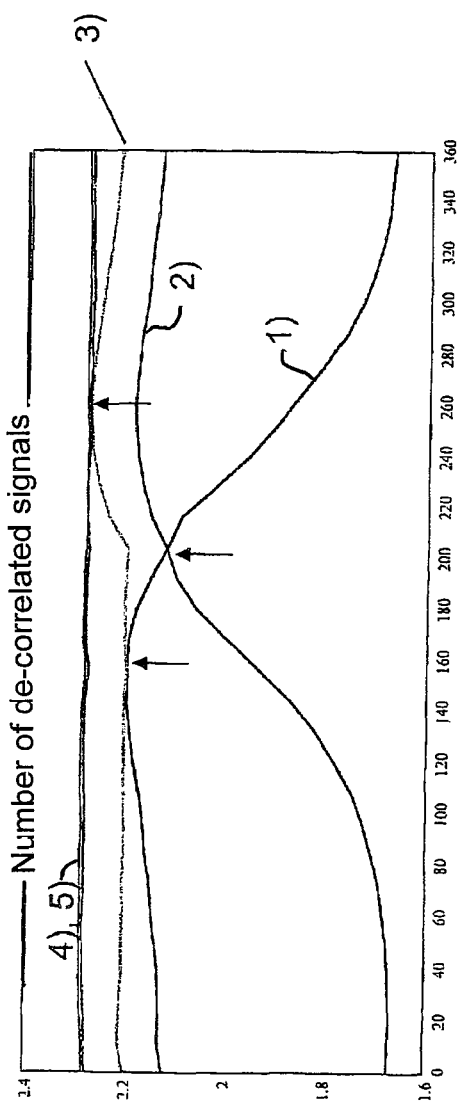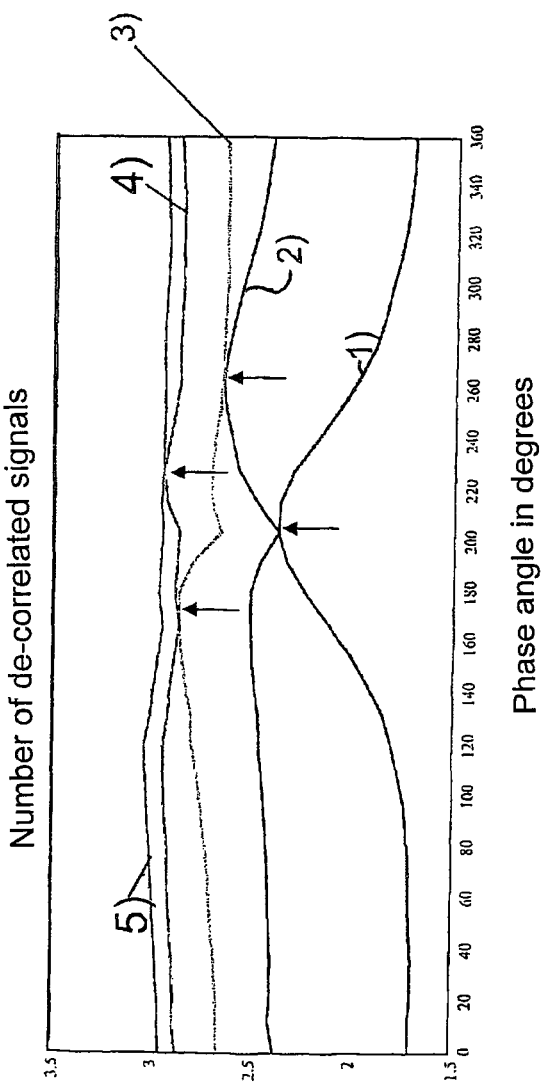
Fig. 12a
Fig. 12b

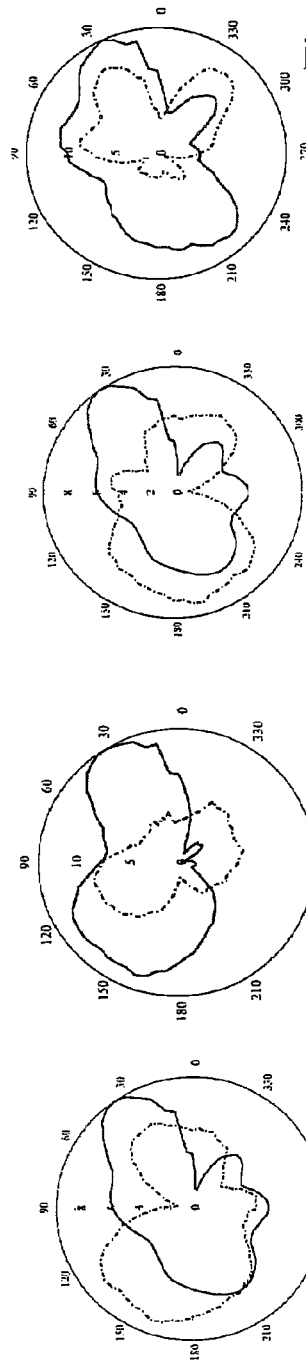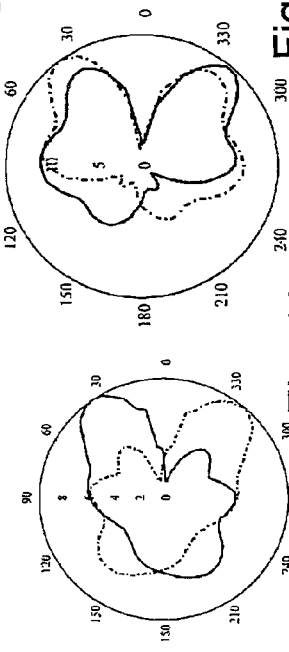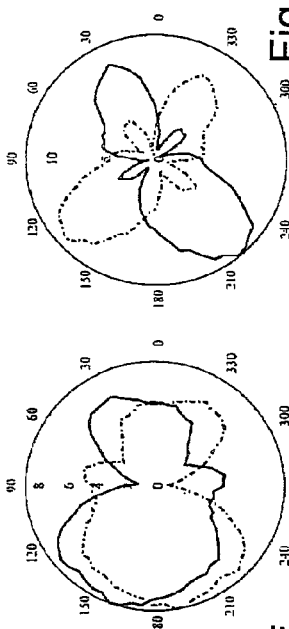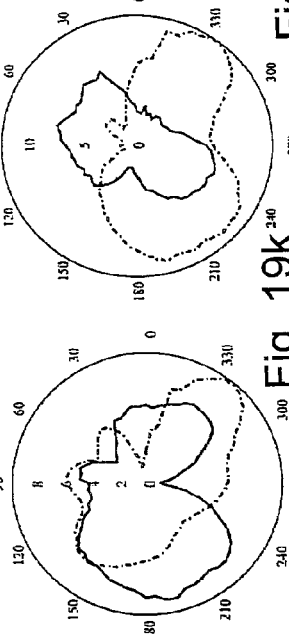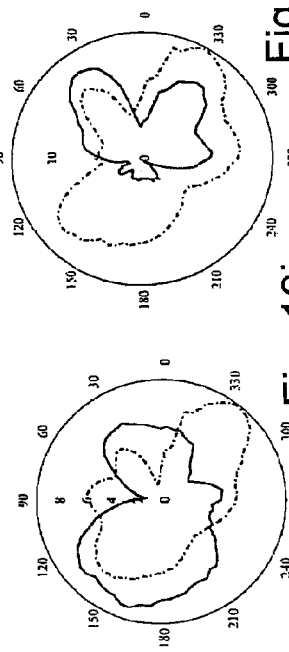

ANTENNA DIVERSITY SYSTEM FOR RADIO RECEPTION FOR MOTOR VEHICLES

CROSS REFERENCE TO RELATED APPLICATIONS

This application claims priority from German Application Serial No. 10 2005 043 304.9 filed on Sep. 12, 2005, and German Application Serial No. 10 2006 039 357.0 filed on Aug. 21, 2006 the disclosures of which are hereby incorporated herein by reference in their entirety.

BACKGROUND OF THE INVENTION

The invention relates to an antenna diversity system for radio reception for motor vehicles, which comprises a multi-antenna system (2) having several antennas (A1, A2, ... AN) with antenna feed lines 2a. There can be a diversity switching device for selection of a different reception signal, and an evaluation circuit which evaluates the reception quality of the reception signal just arriving at the receiver. This evaluation circuit is designed to bring a different reception signal in terms of diversity to the receiver if interference occurs, by switching over.

Antenna diversity systems having switching diversity of this type are preferably used for ultra-short-wave radio reception, and are known, for example from German Patent DE 19607045 and also U.S. Pat. No. 6,169,888 to Lindenmeier, the disclosure of which is hereby incorporated herein by reference. Furthermore, a diversity system is known from European Patent EP 1126631, which is also published as U.S. Pat. No. 6,925,293 the disclosure of which is hereby incorporated herein by reference in its entirety. That disclosure or patent aims at achieving a greater useful signal than with a single antenna, by means of same-phase superimposition of two or even more antenna signals, in order to thereby reduce the likelihood of level collapses in a territory with multi-path spread. With this, there is on average a more advantageous signal/noise ratio achieved in the sum signal, with reference to the receiver noise. However, perfect functioning of a same-phase summation of antenna signals is limited due to the fact that the partial waves that are superimposed at the reception location (Rayleigh reception field) differ only insignificantly in their momentary frequency. Using this design, there is no audible reception interference. In reception situations such as those shown in FIG. 1 in EP 1126631, in which wave bundles with different running times $t_0$ to $t_3$ are superimposed at the reception location, the received partial waves no longer have the same frequency and result in frequency interference swings, because of superimposition. These swings frequently result in interference that occurs spontaneously, after frequency demodulation while driving. The wave bundles having the different running times are superimposed at the reception location in accordance with a Rayleigh distribution, in each instance, which has different effects for the different antennas on the vehicle, so that the antenna signals of two diversity antennas on the vehicle can also possess different momentary frequency, particularly in the region of level fading.

The difference in these frequencies is caused by the frequency modulation of the high-frequency carrier and is generally very great, and the resulting phase difference would have to be regulated out in a signal path, by means of a phase rotation element, if the signal does not possess a different frequency interference swing in the other signal path. On the other hand, in case of fast phase regulation, a signal that experienced interference in the first signal path would impress its interference on the second signal path and therefore compel interference in the sum signal. Another disadvantage of a purely phase-regulated system is the restriction to two antenna signals, so that there is no sufficient diversity effect achievable with this system.

Adjacent channel interference acts in similar manner, due to a limited selection in the inter-frequency plane. Also, signals that occur in the reception channel due to intermodulation of other ultra-short-wave transmitters result in frequency swing interference on the useful signal, in combination with level collapses. This interference cannot be eliminated using the phase regulation system with the same phasing. To improve this situation, a controllable logic switching device is therefore contained in EP 1 126 631, in the multi-antenna system. With this design, a reception signal that is different in terms of diversity, in each instance, is passed to at least one of the two inputs of the reception device, with different switch positions, and the summed signal is passed to an interference detector for extremely rapid recognition of a sum signal that has experienced interference due to frequency interference swing. In this case, the interference recognition signal of this detector switches the logic switching device to a different switching position if reception interference is present.

However, the arrangement indicated in EP 1 126 631 has the remaining disadvantage of the occurrence of same channel or adjacent channel interference caused by undesired radio stations. These undesired radio stations frequently form a cause for interference, because of the close frequency occupation with stations. Thus, level maximization by means of the same phasing of the desired signal generally does not eliminate the interference phenomenon. Instead, in such situations it is important to improve the ratio of the useful signal to the interference signal. If the selection of a different reception signal, in terms of diversity, does not result in interference-free reception, the same phasing of the desired signal cannot lead to the goal, because generally the interfering same channel or adjacent channel signal will not be suppressed with this change. The same holds true for reception situations in which wave bundles having greater different running times are superimposed at the reception location. Another particular disadvantage of the arrangement indicated in EP 1 126 631 is in the practical implementation, which generally makes it necessary, for cost-advantageous implementation, for the phase regulation device to be accommodated in the receiver, and therefore at least two separate antenna lines must be brought to the receiver. In automobile construction, this means increased expense and added required space, and is classified as disadvantageous with regard to vehicle handling. As another disadvantage of the phase regulation device, there are, in the Rayleigh field, deep signal collapses, which the regulation device cannot follow, particularly when driving fast, and it must perform transient oscillation on them, thereby causing uncontrolled phase control with interference frequency swings to occur. This in turn can result in interference in reception, on the basis of the frequency demodulation.

However, the great expenditure of material, which results from the second high-frequency line to the receiver, in combination with the need to require a second tuner circuit in the receiver, for the diversity function, is particularly serious for the economic efficiency of the solution indicated in EP 1 126 631.

SUMMARY OF THE INVENTION

The design of this an antenna diversity system, based on the invention can be used avoid these disadvantages and to configure an antenna diversity system that is both cost-advantageous and highly efficient. One way to achieve this is to provide a design which requires only one high-frequency line to the receiver, while having a plurality of antennas, and therefore does not require any additional tuner circuit in the receiver for this purpose.

The advantages that can be achieved with the creation of a particularly economical antenna diversity system, having all the advantages of the phase superimposition of antenna signals with regard to a good signal/noise ratio, also with regard to same channel or adjacent channel interference. These advantages also include being able to configure it for a plurality of antennas, with, at the same time, a minimal expenditure of cables in the vehicle. If the antenna diversity module is situated in the vicinity of a compact multi-antenna system, for example, such as on the rear window of a vehicle, for example, only one high-frequency line to the receiver is required while having a plurality of antennas. The improvement of the signal/noise ratio with regard to same channel or adjacent channel interference can be achieved, according to the invention, only by turning away from same-phase summation of antenna signals.

This antenna diversity system can be used to particular advantage for radio reception in cars, and particularly for ultra-short-wave reception. One system can involve the combining of the functions of antenna selection and superimposition of the signals with phases that are different in steps, and/or level transmission values that are different in steps, in a structural unit designated as an antenna diversity module. This antenna diversity module is separate from the receiver. In addition, this unit is preferably positioned close to a multi-antenna system. With this design, having only one connection line to the receiver makes a concept possible that is both cost-advantageous for automobile construction and particularly attractive with regard to handling.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 12a shows a graph indicating diversity efficiency at the end of the ultra-short wave frequency band;

FIG. 12b shows a graph indicating diversity efficiency at the upper end of the ultra-short-wave frequency band;

FIG. 17b shows a directional diagram of a plurality of antennas in a diversity system shown in FIG. 9a;

FIGS. 19a-l are azimuthal directional diagrams of the system shown in FIG. 13;

DETAILED DESCRIPTION

Figure 1:
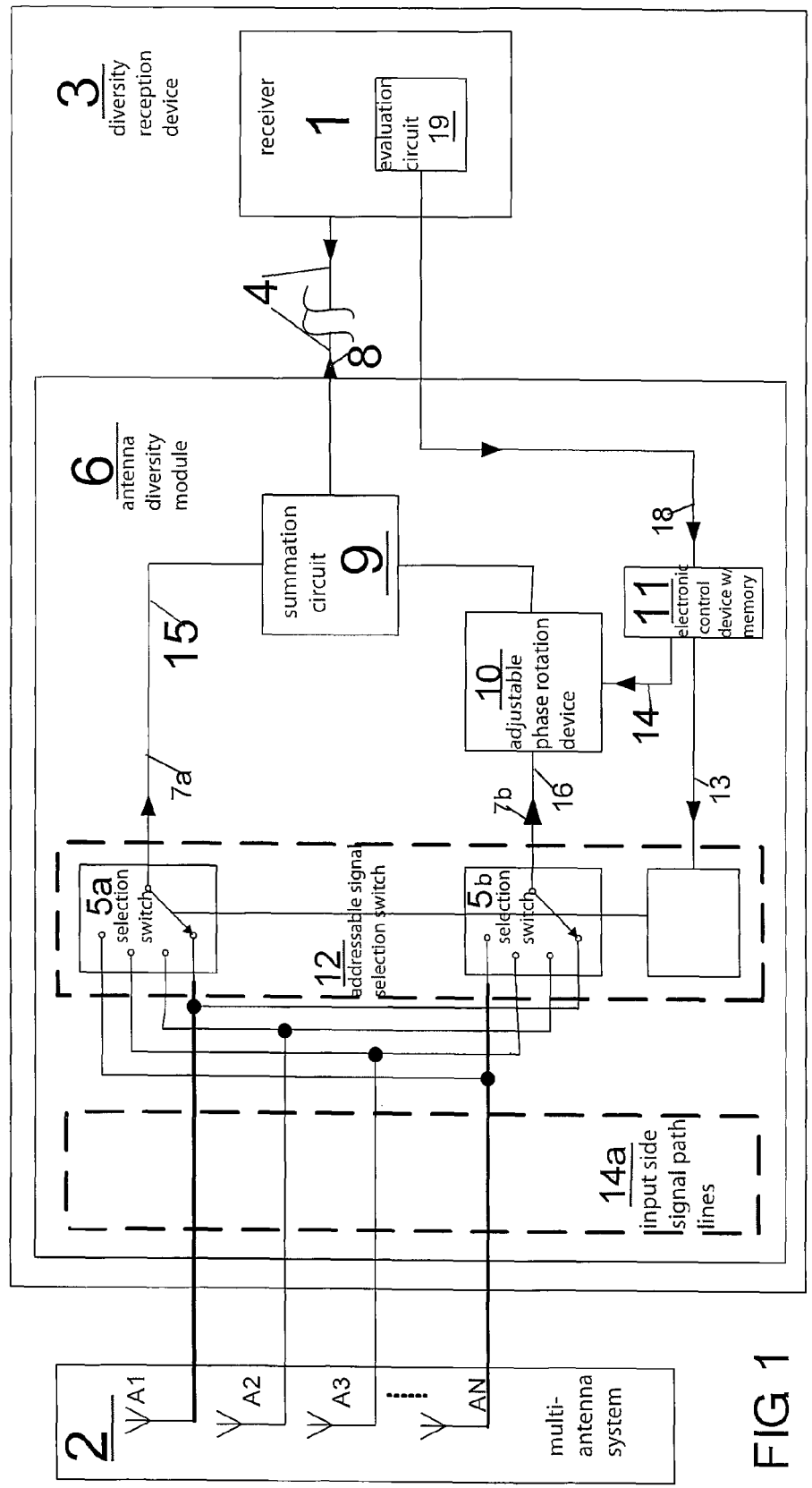
FIG. 1 is a schematic block diagram of a first embodiment of an antenna diversity system of the invention.

Referring in detail to the drawings, FIG. 1 shows a schematic block diagram of an antenna diversity system comprising a group of antennas or multi antenna system 2 which include a plurality of antennas A1, A2, A3, AN . . . This multi antenna system 2 is in communication with a diversity reception device 3 via a series of input side signal path lines 14a. Diversity reception device 3 includes a receiver 1, and an antenna diversity module 6 which includes an addressable signal selection switch 12 having a plurality of selection switches 5a and 5b which are controlled by a switch controller 12a.

Inside of diversity reception device 3, there is a branching of the input signal path 14a into a first separate output signal path 15 having a reception signal 7a, and a second separate output signal path 16 having a reception signal 7b. With this design, there is an adjustable phase rotation device 10 disposed along signal path 16. There is also a summation circuit 9 coupled to both of these paths 15 and 16. The summation circuit 9 is used to sum the reception signals in the two paths 15 and 16.

The addressable signal selection switch 12, is used to select the antennas. This signal selection switch 12 is coupled to evaluation circuit 19 present in receiver 1 and also optionally controlled by way of an electronic control device with memory 11 which sends instructions to switch controller 12a. The phase rotation device 10, that can be set in fixed manner, can be configured as an addressable phase rotation element 28 that can be set digitally, and the phase setting signal 14 can be configured accordingly, as a logic address signal.

Figure 2:
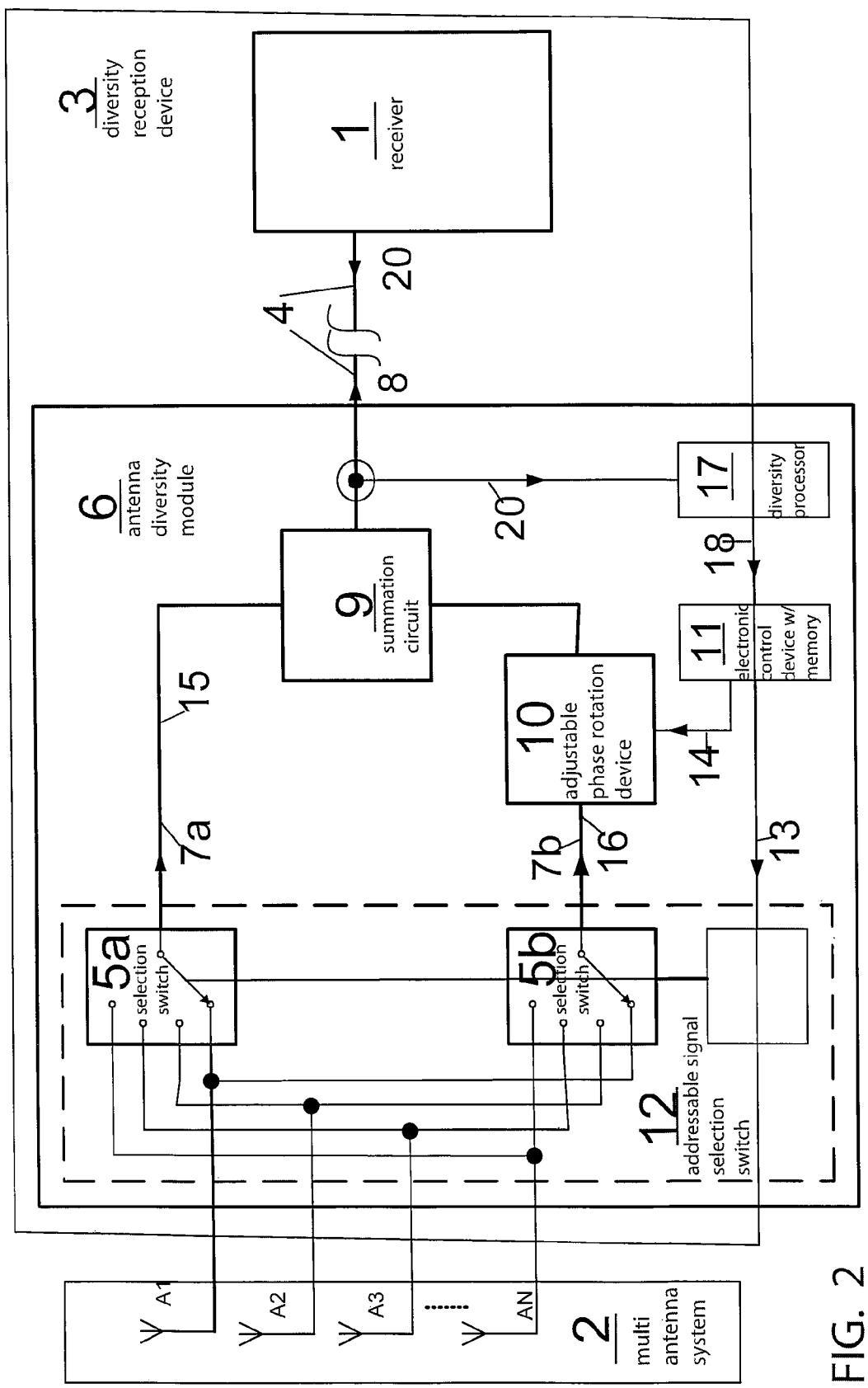
FIG. 2 is a schematic block diagram of a second embodiment of the invention having a diversity processor.

FIG. 2 shows an alternative embodiment wherein there is an antenna diversity system formed from a multi antenna system 2, and a diversity reception device 3 as shown in FIG. 1. However, this system includes a diversity processor 17 in the antenna diversity module 6, whereby the interference in the summed output signal 8 is passed to the diversity processor 17 with the intermediate-frequency signal 20, by way of the high-frequency line 4. This diversity processor can be used to detect the intensity and frequency of interference in the received signals.

Figure 3:
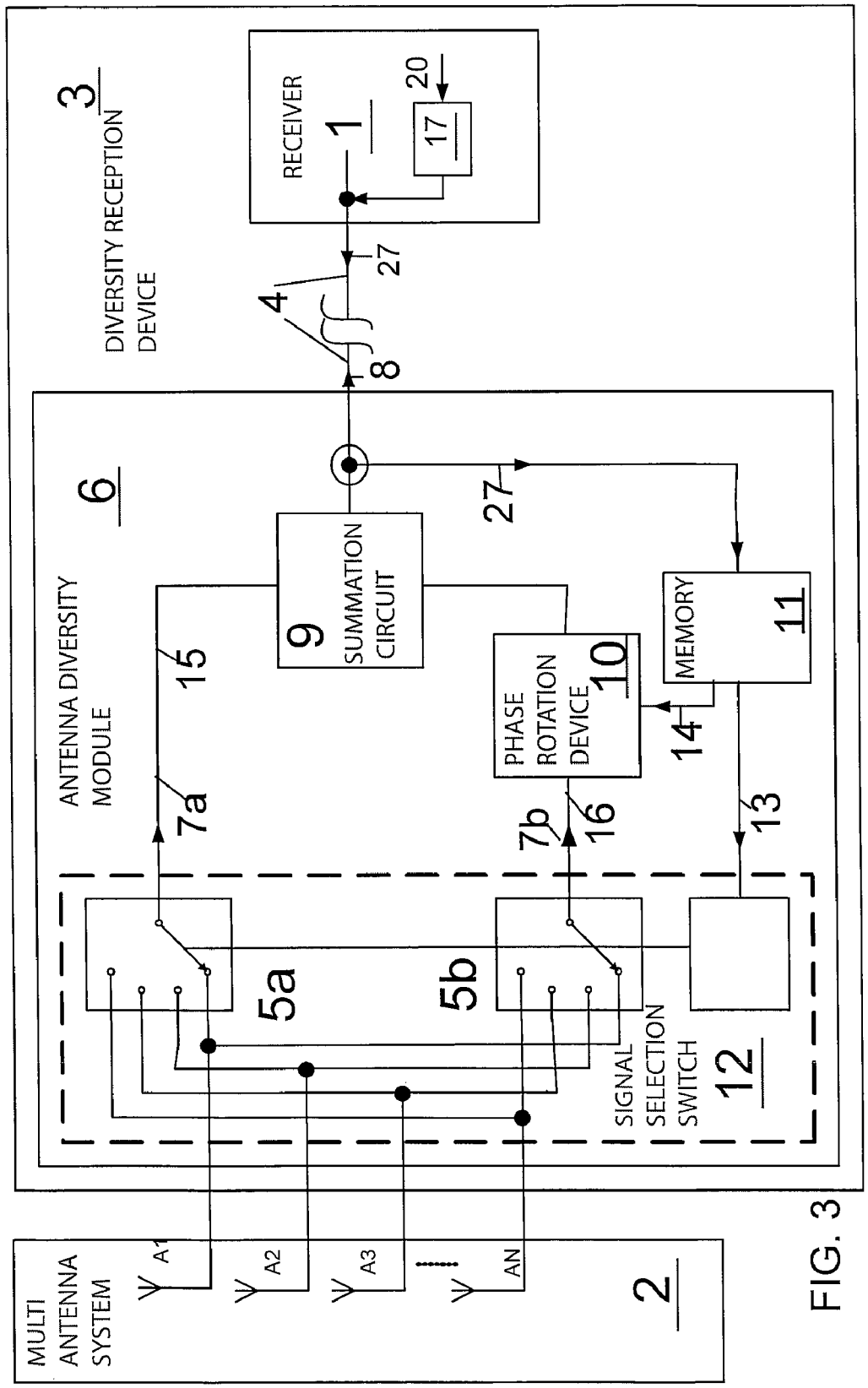
FIG. 3 is a schematic block diagram of a third embodiment of the invention wherein the diversity processor is disposed in a receiver.

FIG. 3 shows a schematic block diagram of another embodiment of the invention. With this design, the antenna diversity system as is similar to that in FIG. 1, but with this design, diversity processor 17 is disposed in receiver 1. An address selection signal 27 is produced in the diversity processor 17, which is passed to the electronic control device with memory 11 in the antenna diversity module 6, by way of the high-frequency line 4. Control device 11 then passes this signal on to adjustable phase rotation device 10 and to addressable signal selection switch 12 for controlling the selection of phase and for selecting a particular input line from an antenna.

Figure 4:
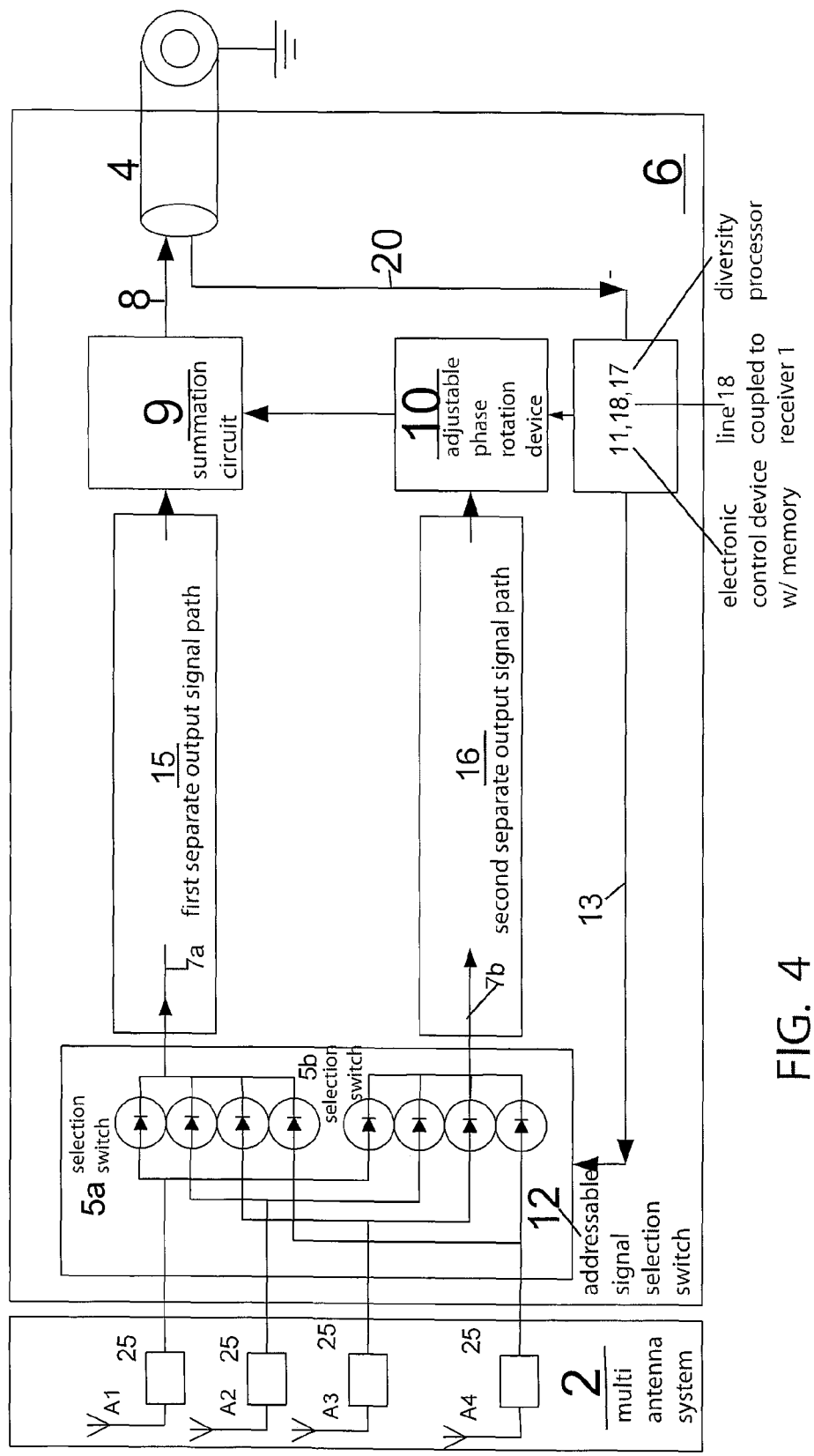
FIG. 4 is a schematic block diagram of a diversity system as shown in FIG. 2, further comprising active amplifier elements.

FIG. 4 shows another embodiment of an antenna diversity system having an antenna diversity module 6 as in FIG. 2, but with antennas having active amplifier elements 25 in the multi-antenna system 2. There are also selection switches 5a, 5b which are implemented as diodes, which also allows zero switching position 24a, 24b.

Figure 5:
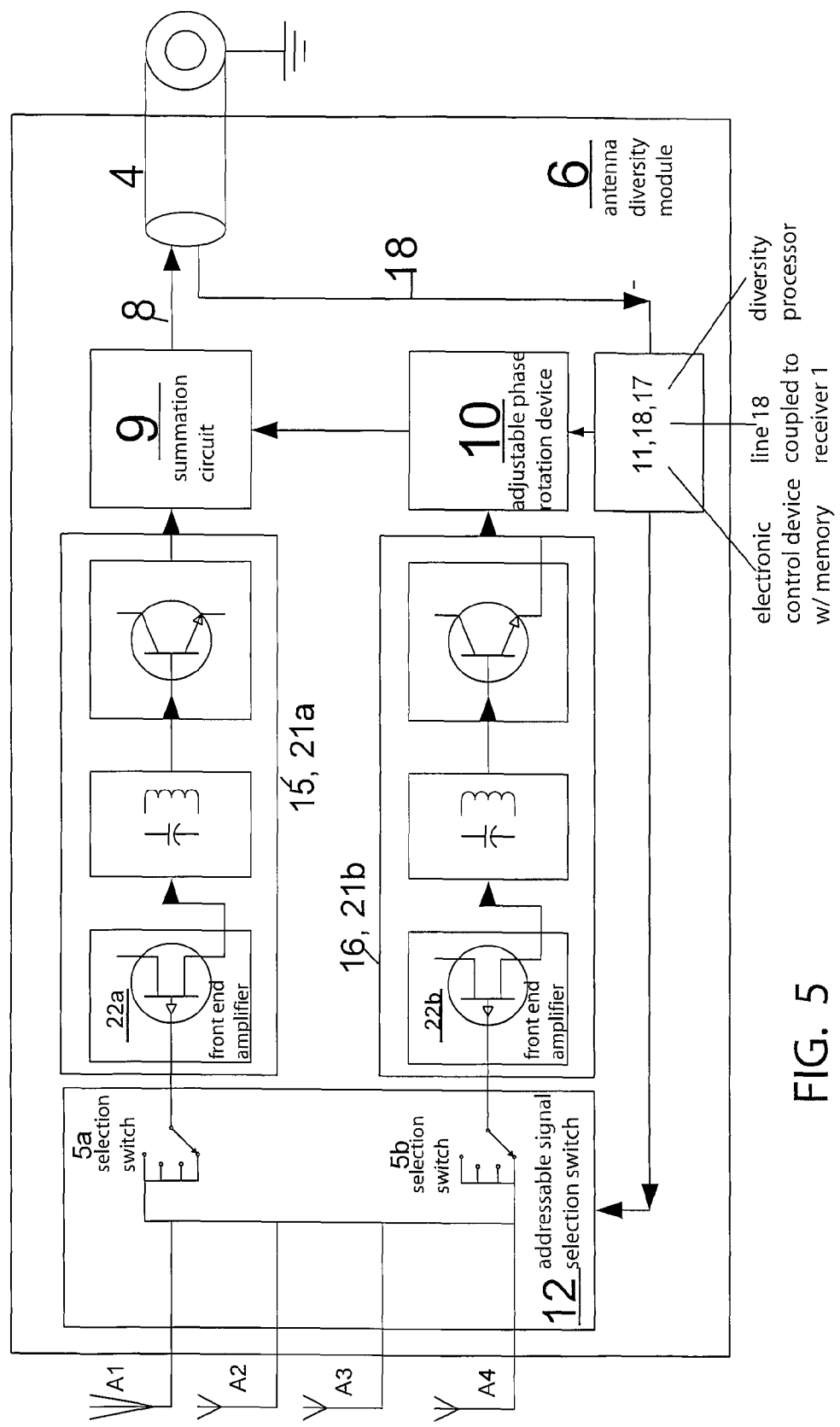
FIG. 5 is an antenna diversity system of the invention comprising passive antennas and antenna amplifiers.

FIG. 5 is a schematic block diagram of another embodiment of the antenna diversity system which includes the multi-antenna system 2 and antenna diversity module 6 as in FIG. 2. With this design, along first signal path 15, there are passive antennas with antenna amplifier(s) 21a, including a high-impedance front end amplifier 22a. The second signal path 16, also includes an antenna amplifier 21b with a high-impedance front end amplifier 22b. First signal path 15 feeds into summation circuit 9 while second signal path has its output feeding first into adjustable phase rotation device 10 and then into summation circuit 9. With this design, adjustable phase rotation device 10 has at least two inputs, first the input from second signal path 16, and second an input from electronic control device 11 or diversity processor 17. This electronic control device has its input feeding from high frequency line 4 through line 18 which is coupled to receiver 1 having evaluation circuit 19 (not shown).

Electronic control device 11 and/or diversity processor 17 has an output also extending into an input of addressable signal selection switch 12 which is used to switch between the different antenna input lines.

Figure 6:
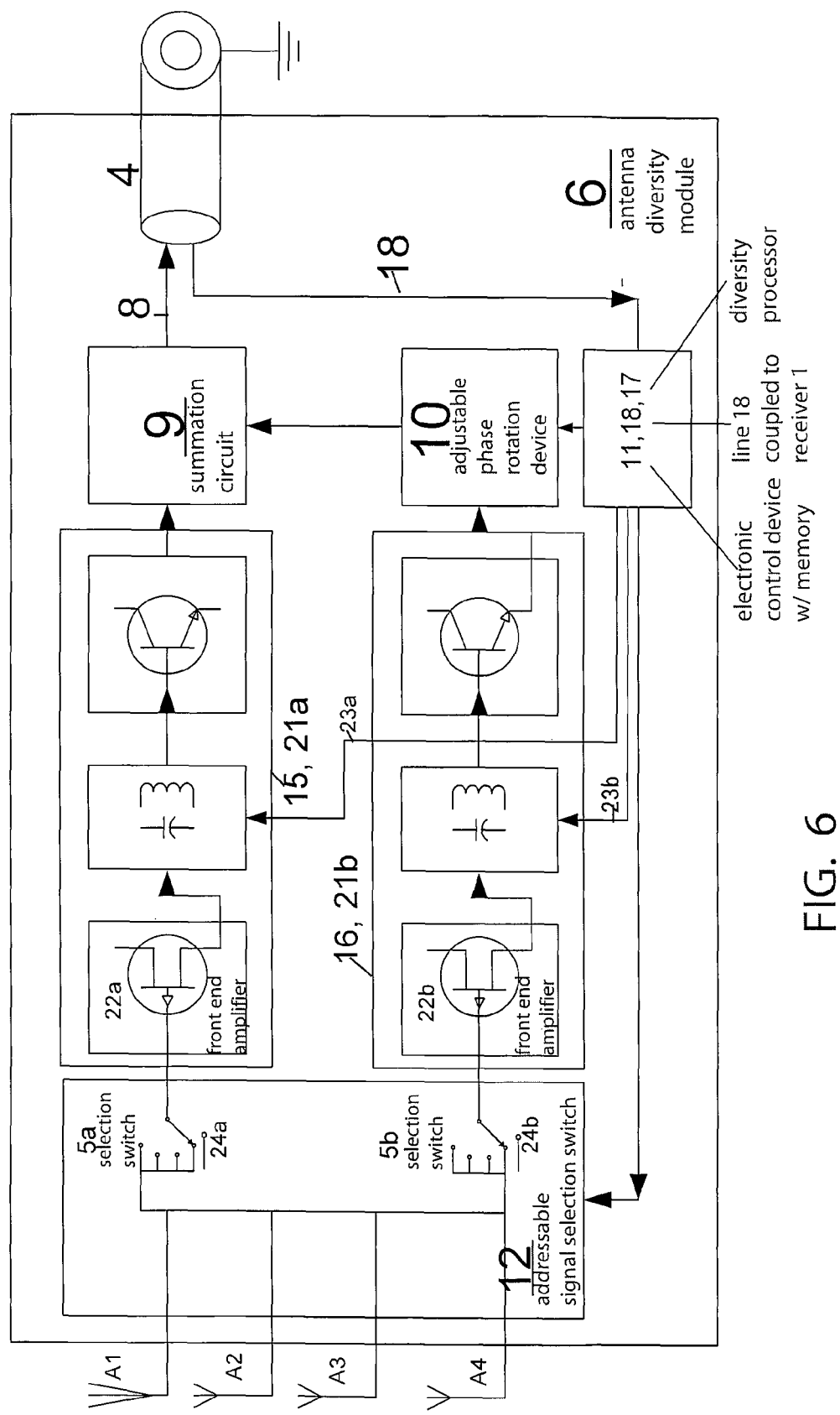
FIG. 6 is a antenna diversity system as disclosed in FIG. 6 further comprising an adjustable transformation element.

FIG. 6 is a schematic block diagram of another embodiment of the antenna diversity system. With this design, antenna amplifiers 21a, 21b are present as in FIG. 5. However, with this design, there is an adjustable transformation element 29a, 29b, in each signal path set by means of the address control signal 23a, 23b for compensation of the frequency response of the antennas. These adjustable transformation elements are each disposed inside of their respective antenna amplifiers 21a and 21b. These transformation elements 29a and 29b each have their inputs coupled to the respective outputs of high impedance front end amplifiers 22a and 22b.

Figure 8:
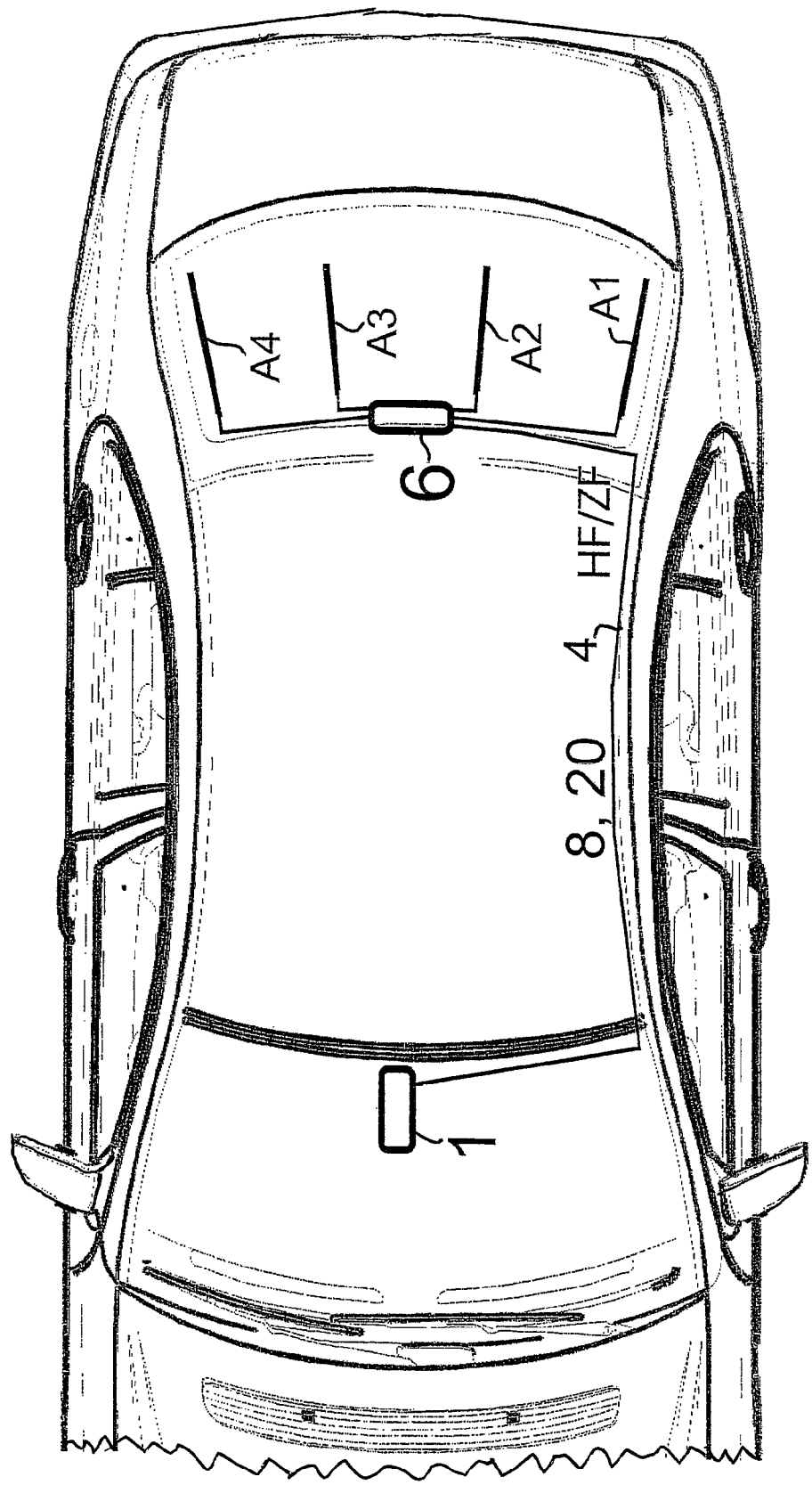
FIG. 8 is a top view of a car showing the diversity system being implemented.
Figure 7:
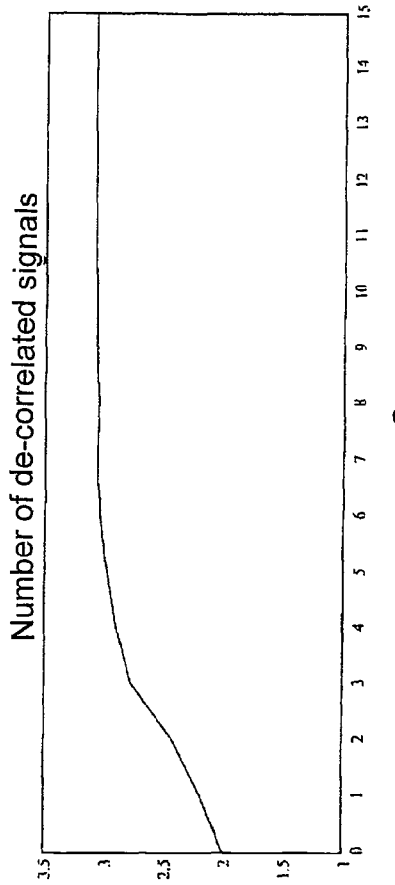
FIG. 7 is a graph showing the diversity efficiency of two heating field antennas of a vehicle.

FIG. 7 is a graph which shows an example of the diversity efficiency of two heating field antennas of a vehicle (see FIG. 8) with c as the number of linear subdivisions of the angle range $2\pi$. At the point c=0, the antennas are separately available without superimposition of the signals. At point c=1 the antennas are separately available without superimposition of the signals (by way of zero switching position 24a or 24b) and the superimposition of the signals with angle value $2\pi/1$ (corresponds to angle value 0). At point c=2 the antennas are separately available without superimposition wherein all of the superimpositions with angle value differences $2\pi/2$ are shown. At point c=n, the antennas are separately available without superimposition. This is shown with all superimpositions having angle value differences $2\pi/n$ FIG. 8 shows an implementation of the diversity antenna system on an auto, or mobile vehicle. This is a particularly advantageous high-performance and economically advantageous embodiment of the antenna diversity system 2, 3 for ultra-short-wave reception. The antenna diversity module 6 is mounted on the rear window of the car, with short connections to the passive antennas imprinted as conductors. The antenna diversity module 6 is connected with receiver 1 for transmission of the summed output signal 8 and the intermediate-frequency signal 20, for example, with only one connection cable 4, serving as a high-frequency line 4. The direct-current supply for the antenna diversity module 6 can also take place by way of the interior conductor of the high-frequency line 4, in an advantageous manner.

Figure 9B:
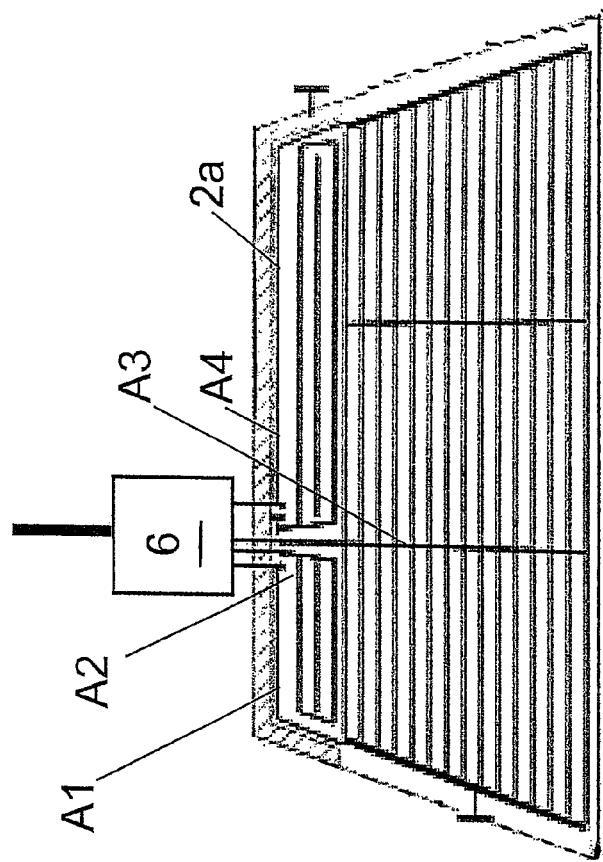
FIG. 9b is a second view of the rear window.
Figure 9A:
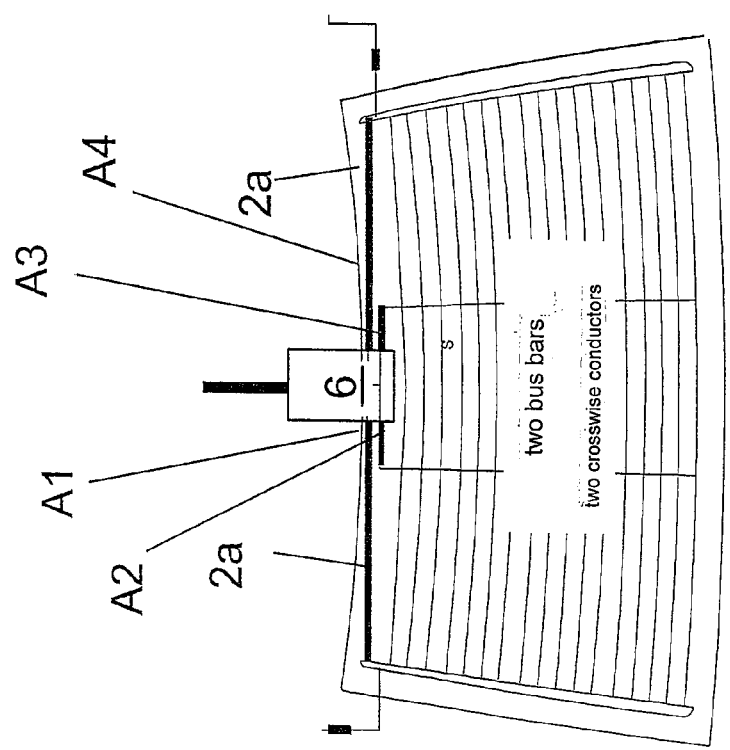
FIG. 9a is a first view of the rear window.

FIGS. 9a and 9b show two different implementations of these designs on heating fields of antennas. In this case, there is shown the typical, advantageous structures of antennas on the rear windows of a vehicle, with an antenna diversity module 6. The antennas A1 and A4 are formed by means of connections on the bus bars of the heating fields with the feed lines 2a. Two additional antennas A2 and A3 are configured as crosswise conductors crosswise to the horizontal heating conductors. FIG. 9b shows that antennas A1 and A4 as shown in FIG. 9A wherein antenna A3 is shown as a crosswise conductor, and antenna A2 as a planar structure between the heating field and the window frame With these designs, antenna diversity module 6 is preferably connected with receiver 1 for transmission of the summed output signal 8 and the intermediate-frequency signal 20, for example, with only one connection cable as a high-frequency line 4. Also the direct-current supply for the antenna diversity module 6 can advantageously take place by way of the interior conductor of the high-frequency line 4. In contrast to the phase-regulated systems described initially, in which the phase is set by means of a regulation system, maximal diversity efficiency can be achieved in the case of a system according to the present invention simply in that the phase rotation elements that are set in fixed manner and are available for selection possess optimal values specifically adapted to the multi-antenna system. In order to perform this adaptation, it is necessary to determine the directional diagrams of the antennas $A_1, A_2, \ldots A_N$ according to amount and phase relative to one another, with reference to a common point, taking into account all of the antenna feed lines 2a and other elements that change the phase. This is preferably done by means of measurement technology, in the antenna measurement field, with a rotating stand, or, if necessary, by means of model calculations.

FIGS 10a, 10b, 10c, and 10d show block schematic diagrams of the fundamental structure of antenna diversity systems according to the invention, for an explanation of the method of effect. All of these FIGS show four different simple embodiments of an arrangement with two antennas A1, A2, and a common signal path 14a ahead of the branching.

Figure 10A:
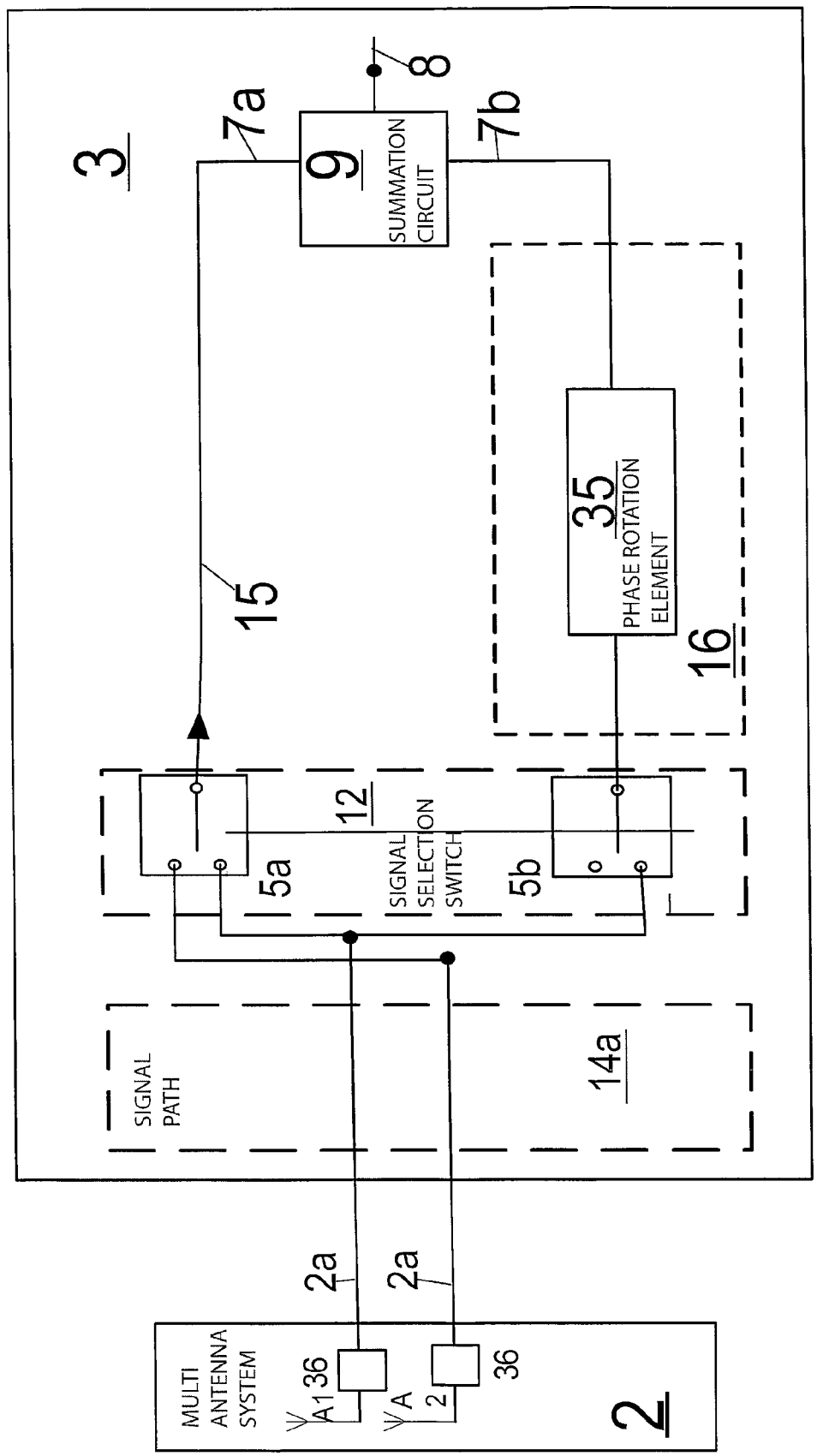
FIG. 10a is a schematic block diagram of a diversity system having at least one phase rotation device.

In FIG. 10a, the branching feeds two switches 5a, 5b, and a phase rotation element 35 in the separate signal path 16, and a summation element 9 coupled to the two signal paths. This summation circuit 9 then feeds into a receiver 1 (See for example FIGS. 1-4). Phase rotation element or device 35 and also other phase rotation elements or devices 35a, 35b, and 35c function in a similar or identical manner to phase rotation device 10.

Figure 10B:
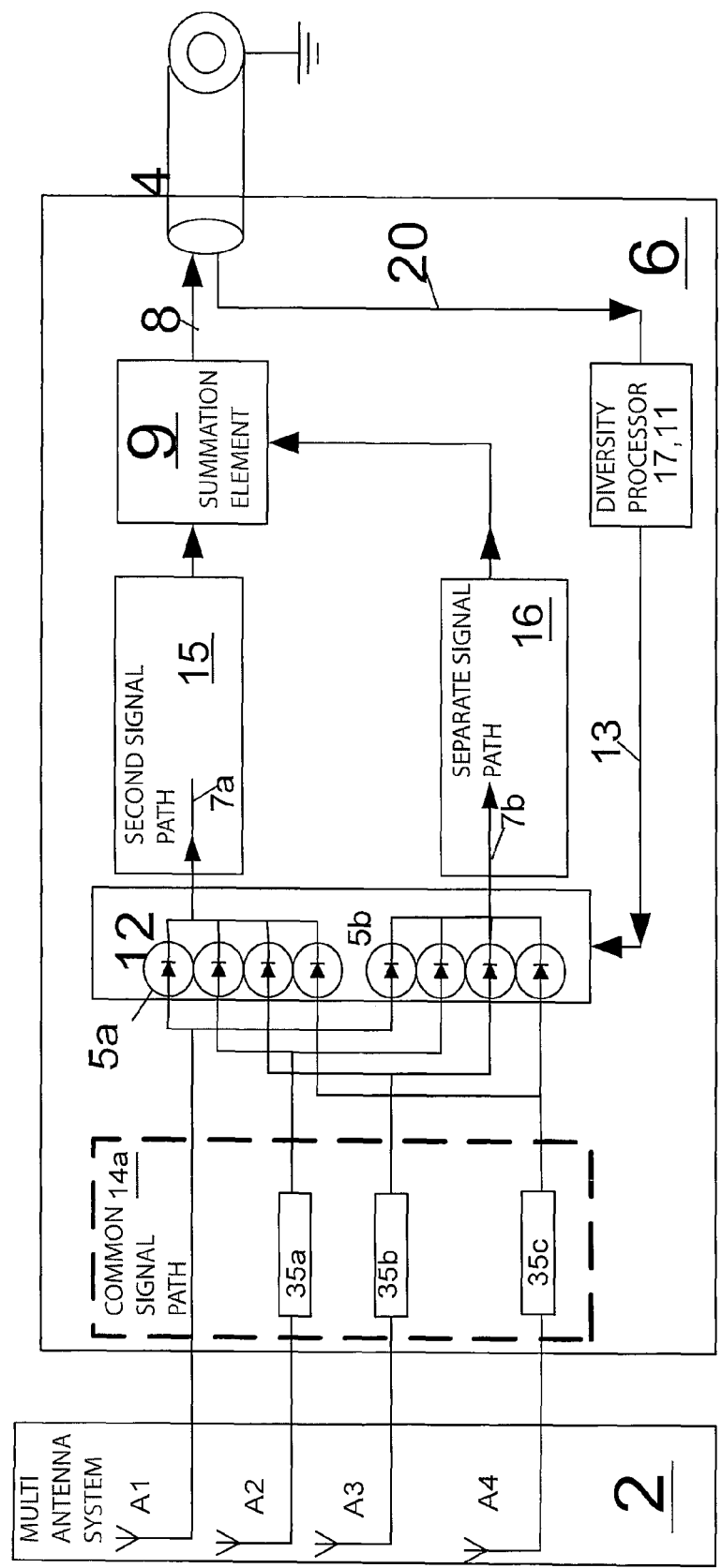
FIG. 10b is a schematic block diagram of a diversity system having a plurality of phase rotation devices.

FIG. 10b shows four antennas having three phase rotation elements 35a, 35b, 35c in the common signal path 14a, to optimize the diversity efficiency in the sum signal 8 by means of the selection of suitable phase rotation values. This design, as well as the design shown in FIGS. 10a, 10b, and 10d show that these phase rotation elements 10, 35, 35a, 35b, 35c, can be positioned along either the common signal path 14a, or the second signal path 16. Alternatively these phase rotation elements could be placed along the first signal path 15 as well.

Figure 10C:
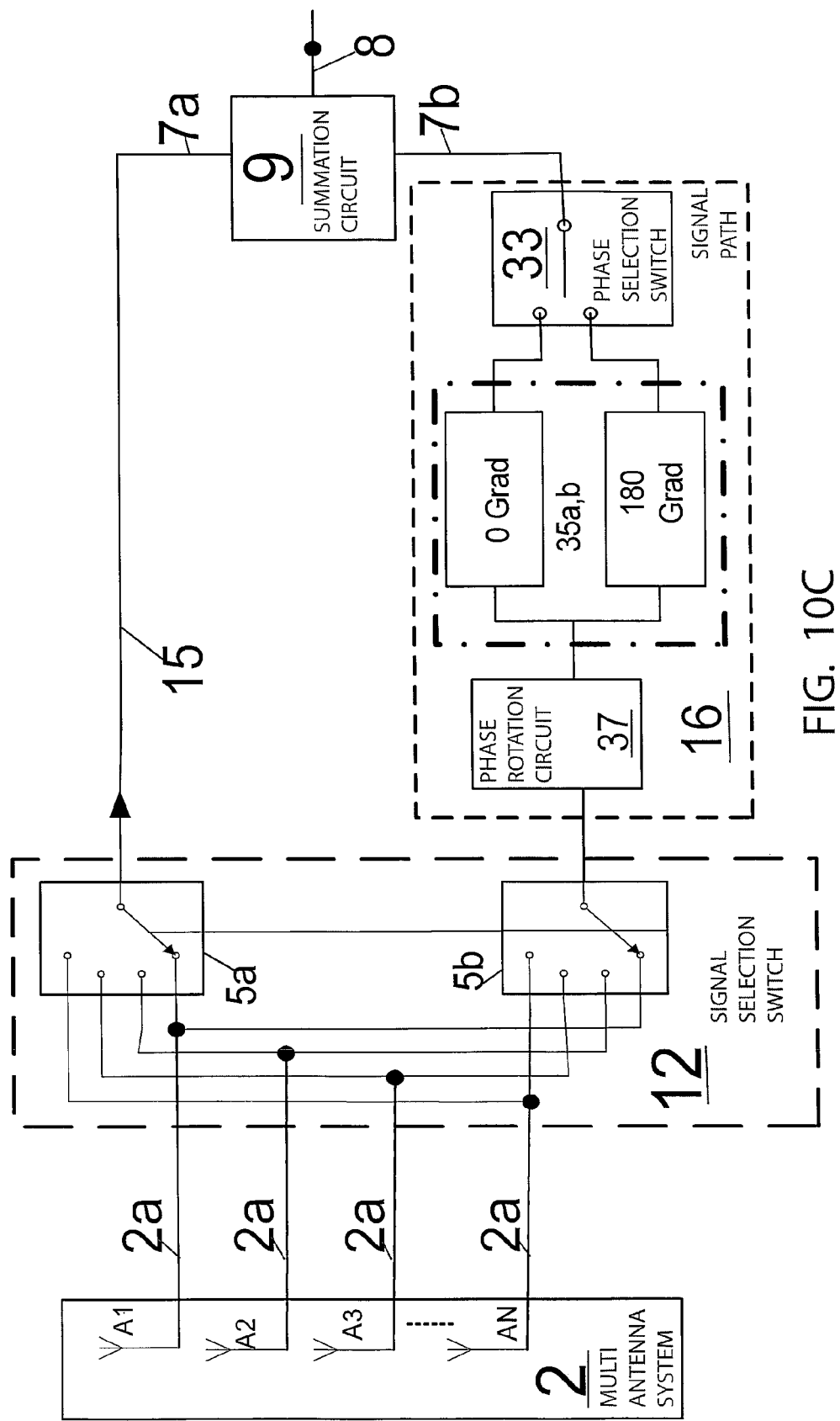
FIG. 10c is a schematic block diagram showing a plurality of phase rotation devices.
Figure 10D:
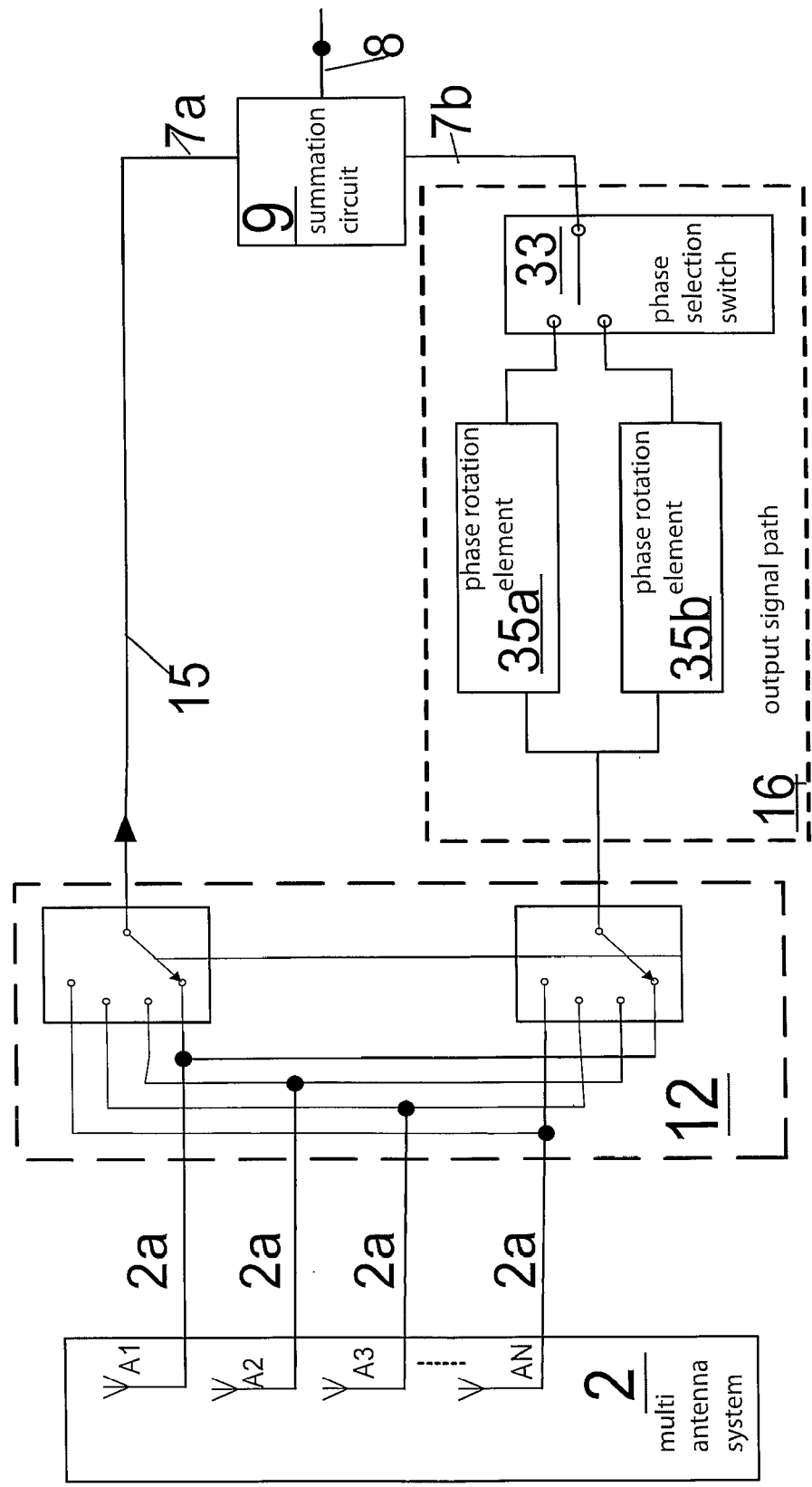
FIG. 10d is a schematic block diagram showing a plurality of phase rotation devices.

FIG. 10c shows the arrangement as in FIG. 10a, but with four antennas and switchable phase rotation values of 0° and 180°, respectively. FIG. 10c is similar to that of FIG. 10a but further comprises a basic phase rotation circuit 37 for improving the diversity efficiency.

FIG. 10d shows the arrangement as in FIG. 10c but with phase rotation elements 35a, 35b having suitable phase rotation angles for optimizing the diversity efficiency. This design does not include the phase rotation circuit 37 but instead includes a phase selection switch 33 which is coupled to said phase rotation elements 35a and 35b at a first end and to said summation circuit 9 at a second end. Phase selection switch 33 is used to select a particular signal having a particular phase to be passed along second signal path 16.

Figure 11:
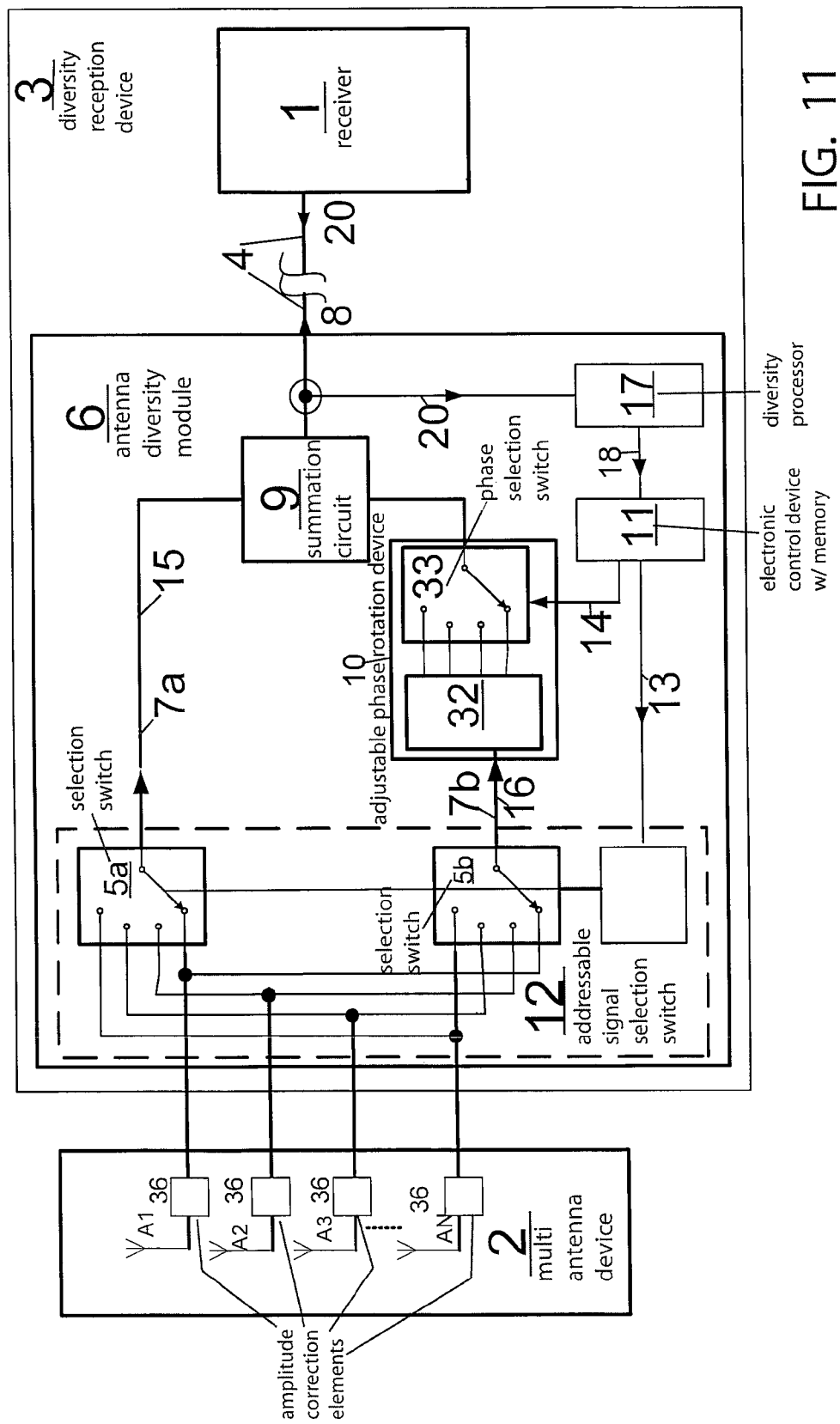
FIG. 11 is an arrangement as shown in FIG. 10d, but with a combined multi stage phase rotation element and a multistage phase selection switch.

FIG. 11 discloses an arrangement that is similar to FIG. 10d but with a combined, multi-stage phase rotation element 32 and multi-stage phase selection switch 33. This design also includes an electronic control device 11 and a diversity processor 17 for controlling the addressable signal selection switch 12 and the multi-stage phase selection switch 33.

FIGS. 12a and 12b disclose two graphs relating to diversity efficiency as a function of the adjusted phase rotation angle of the phase rotation elements. For example, FIG. 12a shows the lower end of the ultra-short-wave frequency band. FIG. 12b shows a reading at the upper end of the ultra-short-wave frequency band.

With both of these graphs, curve 1 relates to the diversity efficiency of an arrangement having two antennas, as a function of the phase angle of the phase rotation element 35 in FIG. 10a, with a clear maximum (arrow). In this case, curve 2 relates to a graph of the diversity efficiency of the arrangement as for Curve 1, but with additional availability of another phase rotation element as in FIG. 10d (but with only two antennas). In this case with all of the curves, the maximum is indicated with the arrow.

Curve 3 shows the diversity efficiency of the arrangement which is similar as to curve 2. However, this curve shows expansions of the system to a total of three phase rotation elements, with a further slight increase in the maximum, as indicated with the arrow.

Curves 4 and 5 show the availability of additional phase rotation elements which do not result in any technically measurable increase in the maximal diversity that can be reached.

Figure 13:
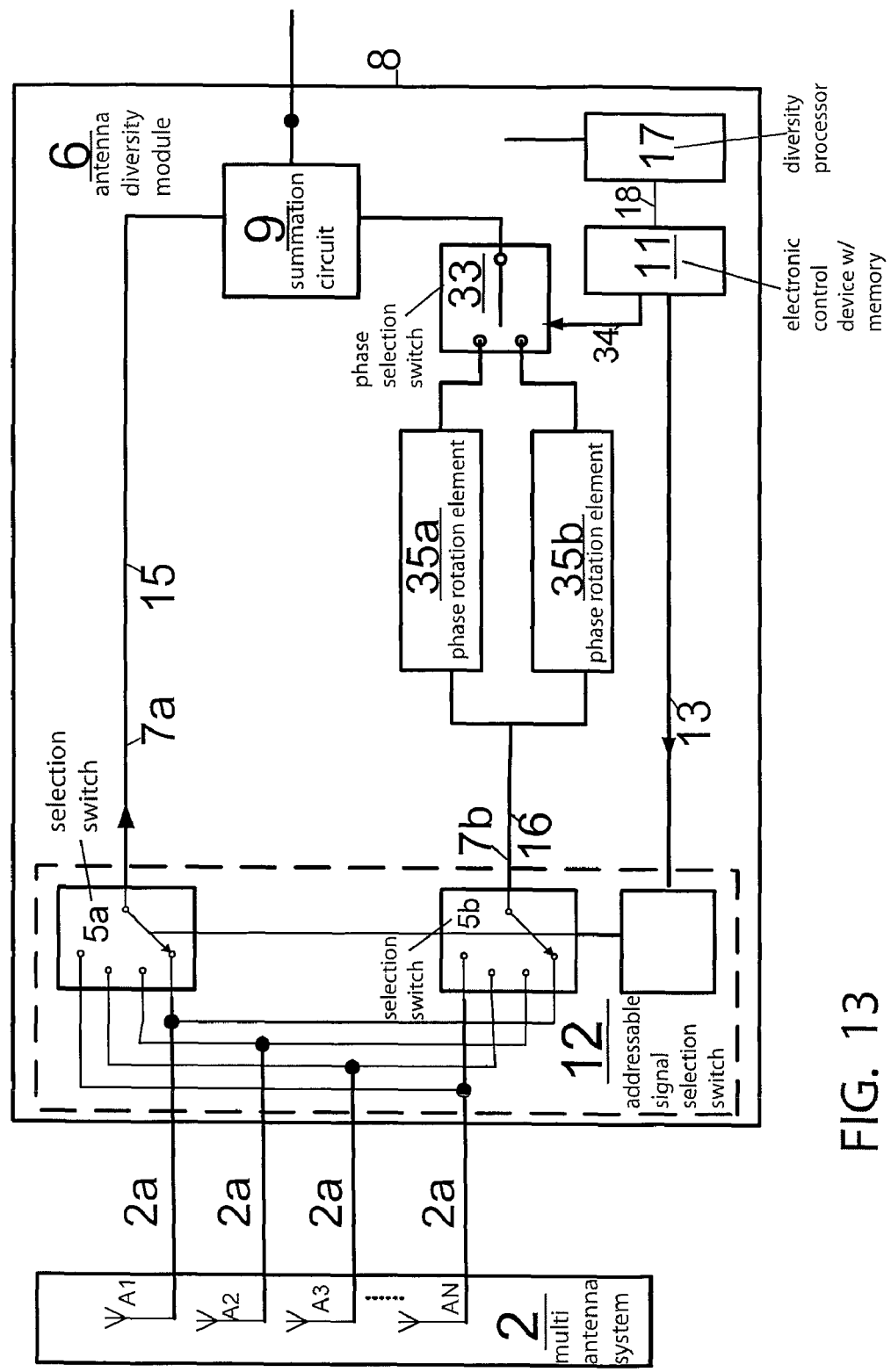
FIG. 13 is a schematic block diagram of a diversity system having two phase rotation elements.

FIG. 13 shows a relatively efficient arrangement according to the invention, with two phase rotation elements 35a, 35b, disposed along second path 16. With this design, the phase angles of the phase rotation elements 35a, 35b are set in fixed manner. With this design, all combinations of the antenna pairs of the multi-antenna system 2 are selected with the addressable signal selection switch 12. The phases of the phase rotation elements are preferably optimally configured to be frequency-dependent, in adaptation to the frequency dependence of the multi-antenna system 2, as shown in FIG. 16b.

Figure 14A:
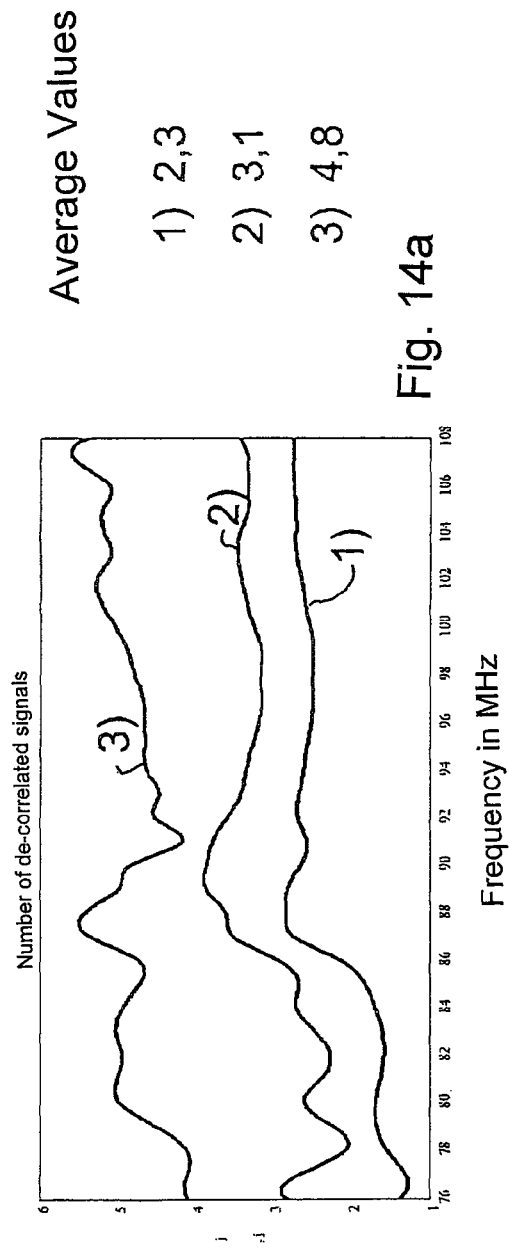
FIG. 14a is a first graph of a multi-antenna diversity system.
Figure 14B:
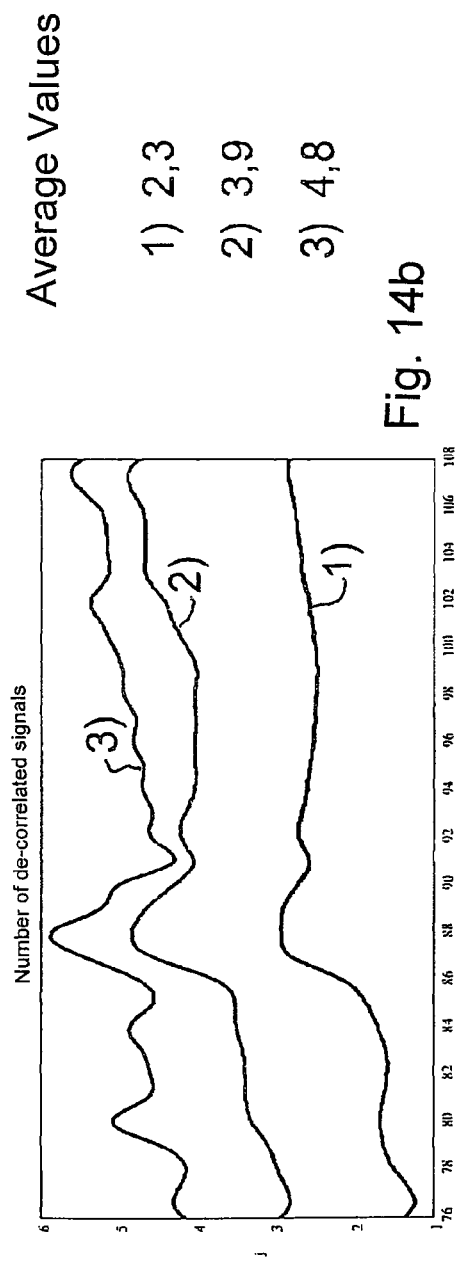
FIG. 14b is a second graph of the multi-antenna diversity system.

FIGS. 14a and 14b show the diversity efficiency using the example of a multi-antenna system 2 having four antennas as in FIGS. 8 and 9a, in the frequency range of FM radio, with different technical expenditure with regard to phase rotation elements. Both of these graphs chart the frequency on MHZ vs. the level of the correction signal. For example, in FIG. 14a, there is shown curve 1 which shows a comparison curve with availability of exclusively four antennas without a second signal path. In this case the average is 2.3.

Curve 2 shows the adjusted phase angles of the phase rotation elements 35a and 35b, respectively, of the arrangement in FIG. 13. These adjustments amount to 0° and 90°, respectively, and the average shown is 3.1. In this case, curve 3 shows two related, optimized angle combinations of the phase rotation elements 35a, 35b for each of the six possible different antenna combinations that can be set using the addressable signal selection switch 12. This curve can be realized using the embodiment shown for example in FIG. 11 with an average as 2.3.

FIG. 14b shows a similar graph wherein with this graph, curves 1 and 3 are similar to the curves shown in FIG. 14a, and show the diversity efficiency. In this case, curve 2 shows the diversity efficiency for the adjusted phase angles of 0° and 180°, respectively of the phase rotation elements 35a and 35b.

Figure 15A:
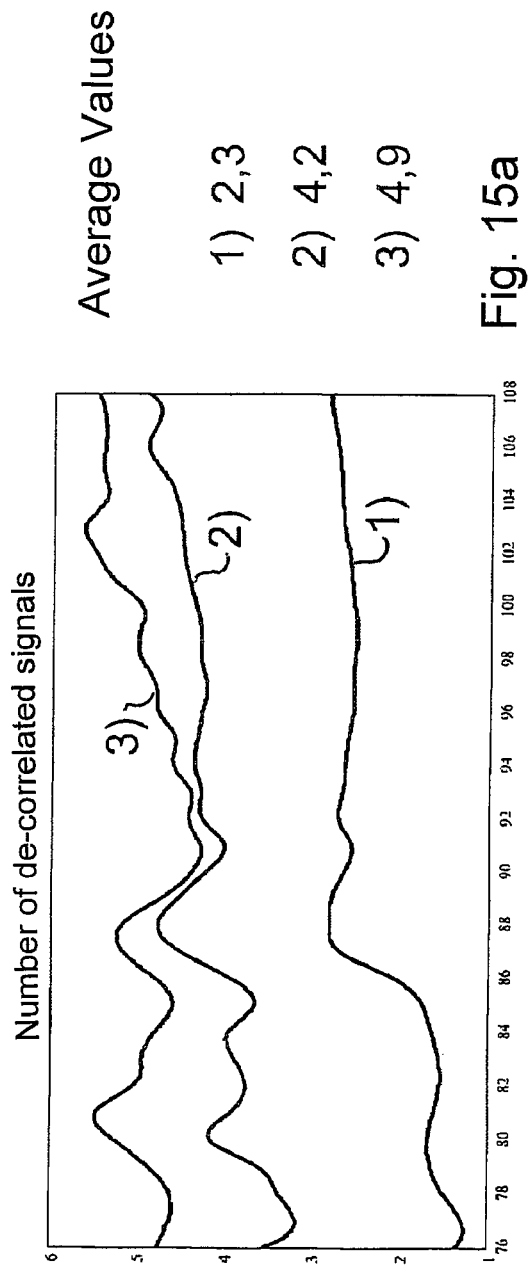
FIG. 15a is a graph showing the diversity efficiency for adjusted phase angles of phase rotation elements.

FIG. 15a shows a graph having three curves. In this case, curves 1 and 3 are similar to curves shown in FIG. 14a. However, curve 2 is shown as a graph of the diversity efficiency for the adjusted phase angles of 0° and 180° of the phase rotation elements 35a and 35b, with basic phase rotation element 37 according to FIG. 10c, with optimized frequency response as in FIG. 15b.

Figure 15B:
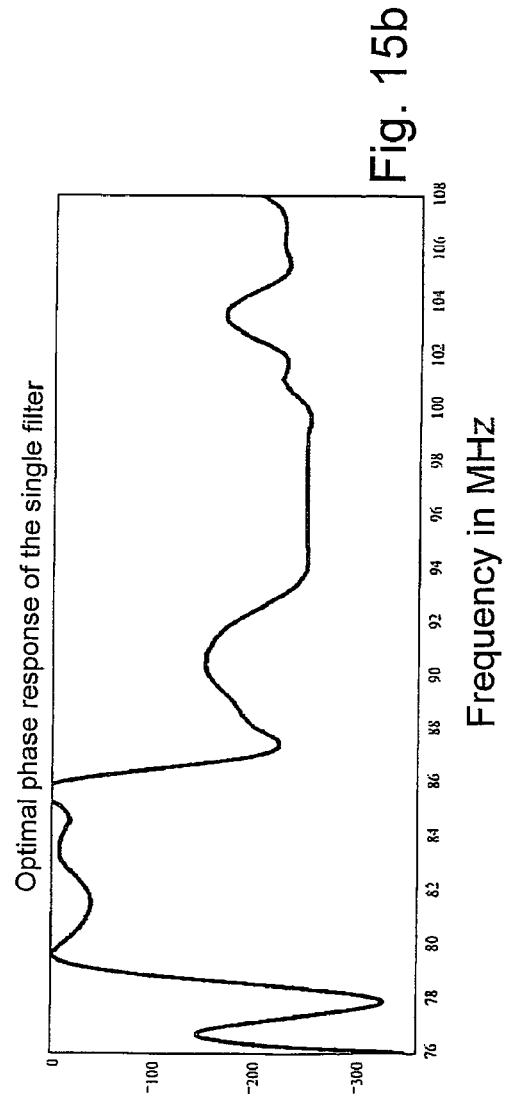
FIG. 15b is a graph showing the frequency dependence of the optimized phase rotation angle.

FIG. 15b shows the frequency dependence of the optimized phase rotation angle of the basic phase rotation element 37 in FIG. 10c. The X axis shows the frequency in MHz while the Y axis shows the phase rotation angle.

Figure 16A:
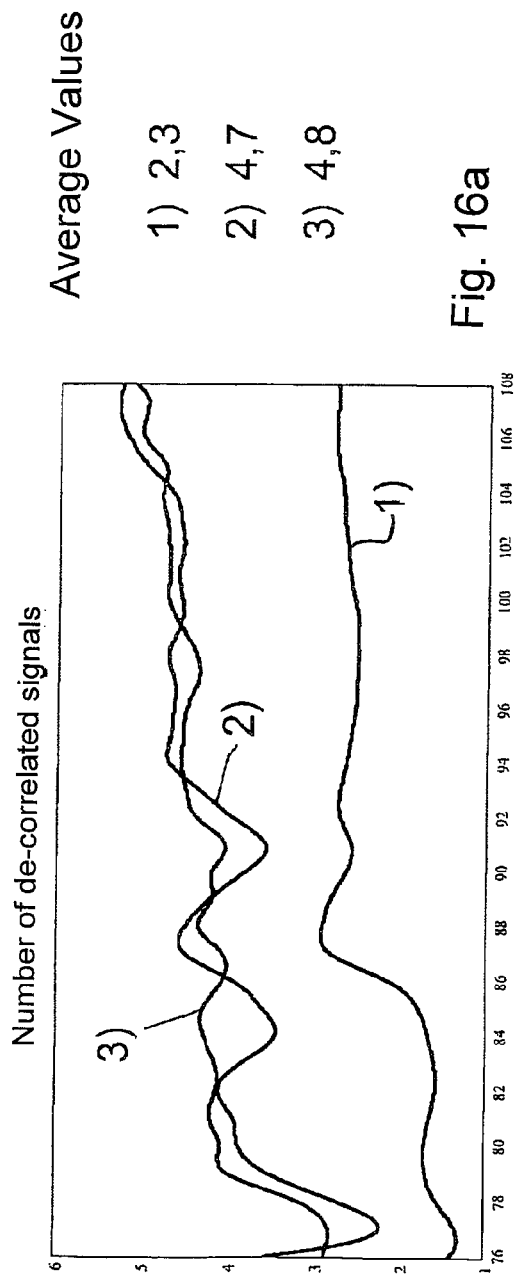
FIG. 16a is a graph showing diversity efficiency of an arrangement shown in FIG. 13.
Figure 16B:
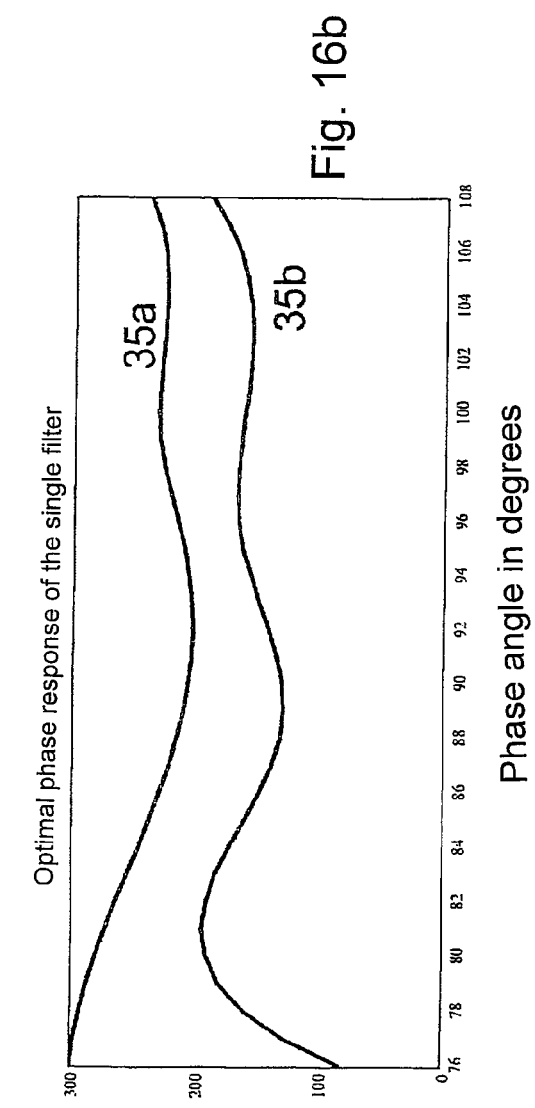
FIG. 16b shows a graph showing a series of curves for the phase rotation elements.

FIGS. 16a and 16b show a diversity efficiency graph showing a plurality of curves 1, 2, and 3. Curve 1 is a comparison curve in the case of availability of exclusively four antennas without a second separate signal path. Curve 2 shows the diversity efficiency of the particularly efficient arrangement in FIG. 13 with two phase rotation elements 35a, 35b, in each instance, with phase angles of the phase rotation elements set in fixed manner and optimized for the frequency, in each instance. Curve 3 shows the comparison of two related, optimized angle combinations of the phase rotation elements which are available for each of the six possible antenna combinations that can be set with the addressable signal selection switch 12.

Figure 17A:
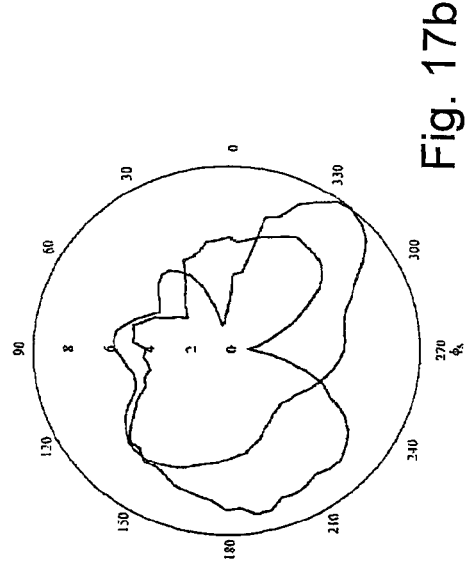
FIG. 17a shows a directional diagram of a plurality of antennas.
Figure 17B:
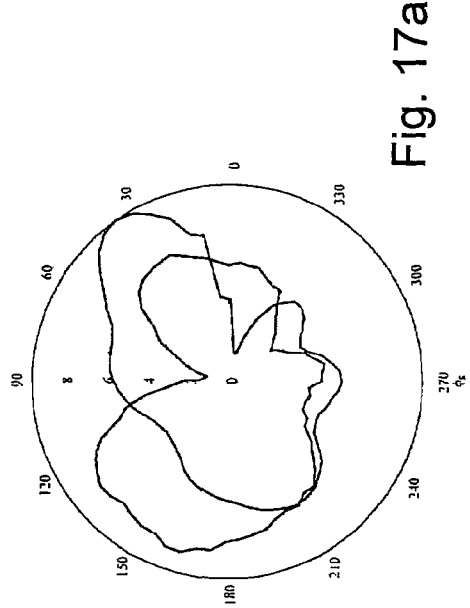

FIGS. 17a and 17b show the directional diagrams of the antennas A1, A2, and the antennas A3, A4 reflected to them, of the multi-antenna system 2 in FIG. 9a. The azimuthal average values of the directional diagrams are adapted to one another by means of amplitude correction elements 36.

Figure 18:
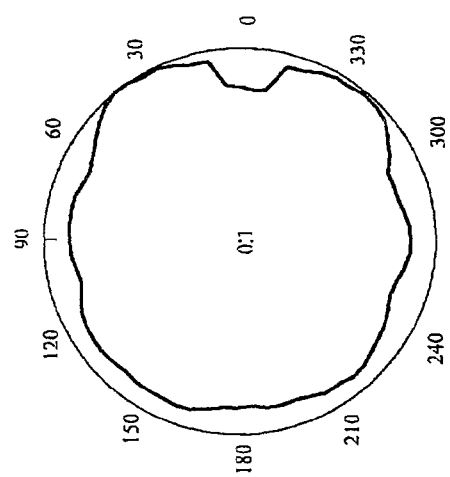
FIG. 18 is an azimuthal directional diagram of the maximal value that is available at every azimuthal angle.

FIG. 18 shows the azimuthal directional diagram of the maximal value that is available at every azimuthal angle, from the available directional diagrams shown in FIG. 19, with a diversity arrangement according to FIG. 13.

FIGS. 19a-i show the different azimuthal directional diagrams of the arrangement in FIG. 13, with two phase rotation elements 35a, 35b, in each case, with phase angles of the phase rotation elements set in fixed manner, optimized for the frequency, in accordance with the angle values in FIG. 16b, and with diversity efficiency in accordance with Curve 2) in FIG. 16a. The FIGS. 19 a), c), e), g),i), k) each show the two individual diagrams of the antenna combinations selected by the addressable signal selection switch 12. The six FIGS. 19 b), d),f), h),j), l) standing next to them, in each instance, show the two directional diagrams that result from a combination with the indicated phase rotation elements. All together, the directional diagrams of the four individual antennas and, in addition, a total of twelve directional diagrams are obtained by means of selection with the phase selection switch 33.

Figure 20:
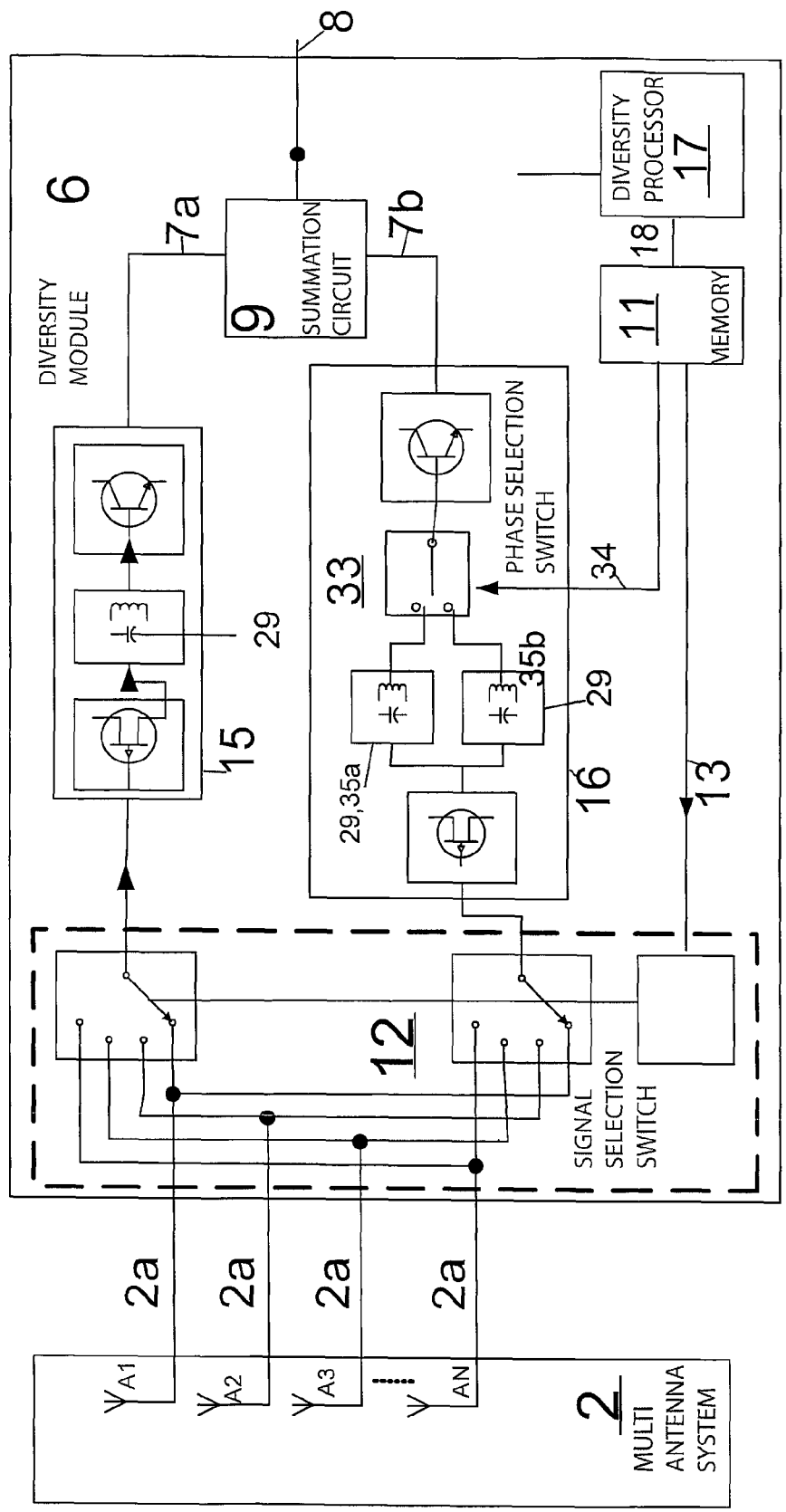
FIG. 20 is an advantageous implementation of the diversity arrangement shown in FIG. 6.

FIG. 20 shows the advantageous implementation form of a diversity arrangement according to the invention, with high-impedance front end amplifier 22a, 22b according to FIG. 6, with transformation elements 29a, 29b, which are additionally structured as phase rotation elements 35a, 35b, and with phase selection switch 33.

Figure 21:
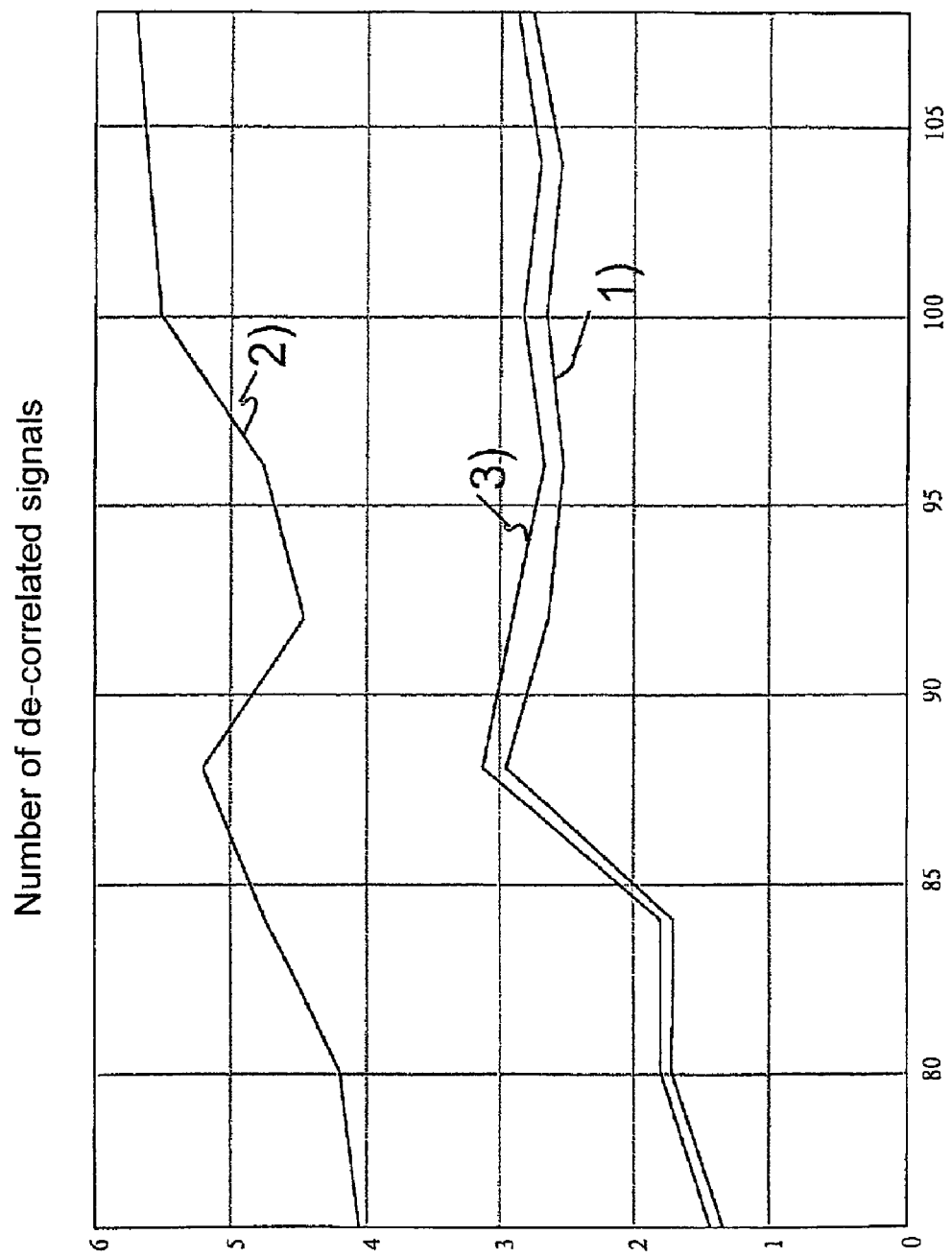
FIG. 21 is a graph showing diversity efficiency of an advantageous embodiment of a diversity arrangement.

FIG. 21 shows the diversity efficiency of an advantageous embodiment of a diversity arrangement according to the invention, with phase rotation elements 35a, 35b, 35c in the common signal path 14a, as in FIG. 10b, in a comparison of different scenarios. With this graph, curve 1 exclusively shows four antenna signals without the formation of sum signals. Curve 2 shows four antenna signals and formation of sum signals from all possible combinations of two antennas, in each instance, assuming advantageous phase rotation values of the phase rotation elements 35a, 35b, 35c. Curve 3 shows the arrangement as in Curve 2, but without effective phase rotation elements 35a, 35b, 35c, the phase rotation values of which are set at zero.

Diversity efficiency serves as a measure of the performance capacity of a diversity arrangement. It corresponds to the number of fictitiously available de-correlated reception signals. The improvement in reception, in the Rayleigh reception field in which interference occurs due to multi-path spread caused by signal collapses (fadings), results from the reduction in interference that is frequently caused in the ultra-short-wave range due to adjacent channels and same channels, as well as in weak signal areas due to noise. If $p_s$ is the probability for the occurrence of interference during reception with only one antenna in a reception territory, then the probability for the occurrence of interference in diversity operation in the same reception territory is reduced to $$p_d = p_s^n$$

where n stands for the characteristic variable of the diversity efficiency of the system. In the following, this reference value serves to describe the performance capacity of the diversity antenna system. Therefore, the greatest possible diversity efficiency with the smallest possible expense in technology is pursued with the present invention.

The possibility of eliminating continuous phase regulation by superimposing two different antenna signals, with regard to maximization of the signal/noise ratio in connection with reception in the Rayleigh reception field, is based on the surprising effect that a discrete subdivision of the angle space of 2p results in no further improvement for making available differently phased superimposed signals, beyond a certain number c. In particular, in connection with the same channel or adjacent channel interference that frequently occurs, the system does not search for a phase setting that leads to same-phase summation in the summation signal 8, but rather to one that provides the maximal signal/noise ratio.

This result is impressively evident from the diagram of FIG. 7, where the diversity efficiency of two rear window antennas is plotted in linear angle steps c, over the number of subdivisions, as the decisive measure, and is typical for such antennas. In all studies, it has been shown that the number c=5, with linear subdivisions in angle steps of approximately 70 degrees, is sufficient to reach the maximally achievable diversity efficiency, in practical terms.

Another advantageous solution relies in detecting the complex directional diagrams of the antennas ($A_1, A_2, \ldots A_n$) on the vehicle, in deviation from the linear subdivision of the phase space of 2p. This solution also determines the optimal discrete angle values with regard to the greatest possible increase in the diversity efficiency with each added angle subdivision, for two antennas from the multi-antenna system 2, in each instance. This design uses a simulation calculation of the diversity efficiency in the Rayleigh reception scenario, based on statistics. This is done in the interests of a smallest possible number of subdivisions for the angle range 0 . . . 2p. With this, each specific switching position (a=0, 1, 2 . . . N, b=0, 1, 2, . . . N) of the addressable signal selection switch 12 can have a phase vector (i=1, 2, . . . ) of discrete phase rotation angles $F_i$ of the adjustable phase rotation device 10 assigned to it, in fixed manner. In this way, a maximal number of I<5 different phase angles $F_i$ can be configured. A significant advantage of the present invention relies on the basis of the absence of a regulation process that continuously intervenes in the phasing. To overcome the disadvantages mentioned above, a few switching steps are sufficient, to find an interference-free signal as the summed output signal 8. Another advantage relies on the additional possibility of selecting several antenna combinations, in pairs, from the multi-antenna system 2, by way of the addressable signal selection switch 12, which further increases the diversity efficiency to a great extent.

To structure the search process for an interference-free signal from the plurality of the settings of the addressable signal selection switch 12, and the adjustable phase rotation device 10 as efficiently as possible, there is a logic processor with memory in the diversity processor 17, in which the intensity and frequency of interference of the available combinations of switching position (a=0, 1, 2 . . . N, b=0, 1, 2, . . . N) of the signal selection switch 12 and discrete phase rotation angles $F_{a, b, i}$ of the phase rotation device 10 are detected and updated on an ongoing basis. From this, a ranking list of the ranking is continuously updated, starting with the combination that has the smallest interference. For this purpose, the interference indicator signal 18 is stored in memory as a logic address selection signal 27, for targeted selectability of the combinations of switching positions (a=0, 1, 2 . . . N, b=0, 1, 2, . . . N) and phase rotation angles $\Phi_{a, b, i}$ stored in the electronic control device with memory 11. When interference occurs, a switch takes place, in targeted manner, to a combination that will allow low-interference reception, with a high level of probability, using the ranking that has been formed.

The selection of the discrete phase rotation angles $\Phi_{a, b, i}$ can be structured cost-advantageously using a phase rotation element 26 that can be set in analog manner. For this purpose, a voltage generated as a phase setting signal 14 in the control device with memory 11, this voltage is passed to the phase rotation element that can be set in analog manner, to set the discrete phase rotation angle $\Phi_{a, b, i}$ in question, in each instance. There is also a logic switching setting signal 13 generated for setting the assigned switching position (a=0, 1, 2 . . . N, b=0, 1, 2, . . . N) of the addressable signal selection switch 12. A suitable phase rotation element 26 that can be set in analog manner and which is formed from 3 dB 90 degree hybrid elements, which are set in step-free manner, using two varactor diodes, in the angle range −90 degrees and 400 degrees, by applying a corresponding varactor diode voltage. All of the other blocks necessary in the antenna diversity module 6 for controlling the antenna diversity system 2, 3 can be implemented as integrated circuits in an advantageously, cost-effective, and space-saving manner, with integrated circuits.

If diversity processor 17 is accommodated in antenna diversity module 6, it is advantageous to pass intermediate-frequency signal 20 to diversity processor 17 by way of high-frequency line 4, as the carrier of the interference in the summed output signal 8. In addition, it can be advantageous to pass mute pulses to receiver 1 by way of high-frequency line 4, to display the switching activities, and to structure the switching to be completely inaudible, with a mute circuit situated therein.

If diversity processor 17 is disposed in receiver 1, the address selection signal 27 that is required for the selection of the setting of a switching position (a=0, 1, 2 . . . N, b=0, 1, 2, . . . N) in combination with an assigned discrete phase rotation angle $\Phi_{a,\,b,\,i}$ can be advantageously passed to antenna diversity module 6 by way of high-frequency line 4.

In territories with large reception signals, phase rotation elements with varactor diodes are endangered by non-linear effects. In advantageous embodiments of the invention, therefore, phase rotation elements preferably set in fixed manner can be used in combination with phase selection switches, to configure a plurality of directional diagrams, with reference to the output of the summation element 9. These directional diagrams are is configured by way of several antenna combinations and phase combinations. These directional diagrams are available for selection by the diversity processor 17, in the different reception situations. FIG. 8, is a particularly advantageous high-performance and economically advantageous embodiment of the antenna diversity system 2, 3 for ultra-short-wave reception, with antenna diversity module 6 on the rear car window, with short connections to the passive antenna structures, imprinted as conductors, is shown.

The method of procedure is explained using the simple example in FIG. 10a, whereby phase rotation element 35 is disposed in second signal path 15 of separate signal paths 15, 16. For an observation of the method of effect of the superimposition of the signals in the two separate signal paths 15, 16, their phase position relative to one another, at the input of the summation element 9, in each instance, is the deciding factor. Thus, the inputs of summation element 9 are the reference point, where the two signals are summed up without any further phase change. To determine advantageous phase angles for the phase rotation element 35 in FIG. 10a, it is therefore necessary to know the directional diagrams of the antennas, with reference to the reference point without the phase rotation element 35. In this connection, the only important thing for the signals to be superimposed is their phase difference. Therefore, elements in one of the signal paths that are introduced subsequently, for example, which change the phase, can be balanced out by the additional introduction of the same phase change in the other signal path.

Once these directional diagrams of the two antennas, with reference to the signal inputs of the summation element 9, are known, with the proviso that the output phase in the phase rotation element 35 is disappearing, then the maximal value for the diversity efficiency can be found by varying the phase rotation angle in the phase rotation element 35, using the calculation method mentioned above. The result is shown in FIG. 12a in Curve 1, with the maximal value indicated with an arrow. The angle value of the phase rotation element 35 for the maximum of the diversity efficiency turns out to be zero if the elements that change the phase and are present in the antennas A1, A2 and the antenna feed lines 2a possess precisely the phase value required for this. Vice versa, it is therefore compulsory that such elements that change the phase can be introduced for the antenna system in FIG. 10a, so that the phase change by means of the phase rotation element 35 in FIG. 10a can be eliminated. As already explained above, the diversity efficiency n is determined from knowledge of the interference probability in operation with one antenna, and in the diversity mode, by way of the equation indicated above. Fundamentally, the interference probability can be determined from measurements during driving operation. However, this method is extremely complicated and time-consuming, if relevant results are supposed to be obtained, based on an extreme plurality of statistically different reception conditions with Rayleigh multi-path spread.

To determine the angle rotation values of phase rotation elements required for the maximal values of diversity efficiency, only model calculations with modern computers can be used, from a practical point of view. With this design, computer-simulated test drives are used for example in an electromagnetic wave field with Rayleigh amplitude distribution. These test drives occur by setting a spatially distributed interference field for the occurrence of interference, to determine the time proportion of the interference in comparison with the entire time of the observation as the interference probability $p_s$ in operation with one reference antenna and $p_d$ in operation in the diversity mode. The diversity efficiency n is determined from this as the equivalent of n de-correlated antenna signals. With this design, the directional diagrams measured for the polarization, in each instance, or derived from this and known according to amount and phase are used. To simulate the Rayleigh multi-path scenario, a sufficient number of waves from statistically selected incoming directions with statistically selected amplitude and phase is assigned to the antenna system, in each instance, over a plurality of fictitious driving segments, and a statistically reliable value for the diversity efficiency can be determined. This method can be used to determine not only the diversity efficiency with regard to noise interference in reception territories having weak reception signals but also for reception territories having interference preferably caused by adjacent channel and same channel. The calculation method is described, for example, in H. Lindenmeier et al., SAE Technical Paper Series 981147 (ISSN0148-7191) Diversity Effectiveness, the disclosure of which is hereby incorporated herein by reference.

In one embodiment, the phase rotation element 35 in FIG. 10a is introduced not into the separate signal path 16, but rather into the common signal path 14a of the diversity reception device 3—for example into the feed line of the antenna A1. With this design, the maximum of diversity efficiency discussed above (Curves 1 in FIG. 12a, b) can also be reached, with a corresponding setting of the phase rotation value of the phase rotation element 35, because of the equality of effect. This maximum is achieved with three signals 8 that are different in terms of diversity, at the output of the summation element 9. The two reception signals of the antennas A1 and A2 are alternatively available at the output of the summation element 9, if the selection switch 5a alternately switches through one of the antenna signals, and if the switch 5b is set in the zero switching position 24a, 24b, and does not pass on any signal. After the switch 5b has been switched over, and the signal of the antenna A2 has been switched through with switch 5a, the desired summed output signal 8 is obtained. As is evident from FIG. 12, the diversity efficiency can be increased from approximately 1.65 to 2.3 by adding this optimized summed output signal 8.

If the multi-antenna system 2 is expanded to four antennas, for example, and if the addressable signal switch 12 with zero switching position 24a, 24b is expanded accordingly, as in FIG. 6, this design can obtain advantageous phase values, with regard to antenna diversity, for such elements that change the phase. In FIG. 10b, this principle of effect is expanded, according to the invention, to a multi-antenna system 2 having four antennas. For this purpose, phase rotation elements 35a, 35b, 35c are introduced into the common signal path 14a. The phase rotation angles are suitably set in the interests of the greatest possible diversity efficiency. Using the addressable signal selection switch 12, which can be designed with switching diodes, all of the antenna signals can be separately switched through to the output of the summation element 9. In addition, in this example having four antennas, all six possible combinations of sum signals from two antenna signals, in each instance, can be formed with their phase states relative to one another, as they are present at the input of the addressable signal selection switch 12, on the basis of the phase rotation elements. The effectiveness of the correct selection of the phase rotation angles in the phase rotation elements 35a, 35b, 35c is impressively evident from the diagram in FIG. 21. There, the diversity efficiency of such a system according to FIG. 10b is shown for an example in the ultra-short-wave range, in Curve 1 with optimal phase rotation angles and in Curve 2 for the case if the phase rotation elements are not contained in the common signal path 14a, or possess the phase rotation angle equal to zero, respectively. To achieve the greatest possible diversity efficiency, advantageous values for the phase rotation angles must be determined using a statistical evaluation of the diversity efficiency.

A further increase in the diversity efficiency as compared with the arrangement in FIG. 10a can be achieved, according to curve 2, by means of adding an additional phase rotation element that is also optimized in terms of phase and can be switched on with a phase selection switch 33 as in FIG. 10d. This method of procedure can be further increased by introducing additional phase rotation elements and by means of corresponding expansion of the phase selection switch 33, but the increase in diversity efficiency is only slight. A comparison of the diagrams in FIGS. 12a and 12b, which apply for the lower and upper end of the ultra-short-wave spectrum, respectively, shows the relatively slight variations of the angles that apply for the maxima, with regard to the frequency change.

The diagrams in FIGS. 12a and 12b show that the greatest increase in diversity efficiency can be achieved with the first two phase rotation elements. In another embodiment of the invention, only two phase rotation elements, can be present and set in optimized manner in the phase rotation angle, available for each combination of two antennas. This is so that these two antennas, in each instance, are separate, and additionally, two signals are available for summation at the output of the phase rotation elements. If one presumes a multi-antenna system 2 having four antennas A1 . . . A4, this results in a need for twelve defined phases of the phase rotation elements 35a, 35b, by way of the six possible combinations of pairs. According to the invention, a multi-stage phase rotation element 32 is provided with twelve outputs and a correspondingly multi-stage phase selection switch 33 according to FIG. 11 in place of separately structured phase rotation elements 35a, 35b. A very significant increase in diversity efficiency can be achieved with a system having such optimized phases for all pairs of combinations of the antenna. This is evident from a comparison of curve 3 in FIG. 14a to curve 1 in FIG. 14b in each instance, which describes the diversity efficiency without the summation according to the invention, with phased antenna signals.

Because of the reduction in interference probability, which increases exponentially with diversity efficiency, this results in a dramatic improvement of the system. The difference in average values of 4.8-2.3=2.5 means, for example, that in the case of an interference probability of 10% when driving with a single antenna, this appears to be reduced, on the average, as compared with the basic system without phased summation of signals, by a factor of $0.1^{2.5}$=approximately ⅓₀₀.

The system is less capable of performance if only the phase values of 0° and 90°, set in fixed manner, of the phase rotation elements 35a and 35b in FIG. 10d, are made available for all antenna combinations, in place of the phase rotation elements set in optimized manner, as described. While the diversity efficiency achieved in this manner, with an average value of 3.1 of Curve 2) in FIG. 14a does result in an improvement as compared with the basic system, it lies decidedly below the maximum that can be achieved, which is represented by curve 3. The situation is similar for a system in which phase values 0° and 180° set in fixed manner are made available, in place of the observation above. However, the average value of the diversity efficiency, at 3.9 of curve 2 in FIG. 14b that can be achieved with this system can be increased even further in another embodiment of the invention, by introducing a basic phase rotation element 37, optimized in terms of the phase rotation angle, as in FIG. 10c. Here, there is a surprising effect in that an increase in diversity efficiency can be achieved by means of introducing basic phase rotation element 37, averaged over all the positions of the addressable signal selection switch 12 and phase selection switch 33, if an optimal value is selected for the phase, at every frequency. The progression of the phase that is required for this is shown for an example in FIG. 15b, over the frequency range of the ultra-short-wave band. This frequency progression of the phase can be approximately implemented with a high-frequency reactance circuit or with a high-frequency filter, respectively. In this connection, it is, of course, equivalent whether the basic phase rotation element 37 having the indicated phase is inserted in the second signal path 16 or, with the negative value of this phase, in the first signal path 15. This interchangeability of insertion in the signal paths 15 and 16 applies analogously for all of the considerations of the phases of phase rotation elements 35a, 35b presented below. Phase rotation elements with 0° and 180° are known both as active and passive inverting elements 38, and can be implemented in cost-advantageous manner. This embodiment of the invention can be implemented very economically with them, with a high value of the average diversity efficiency of 4.2 in the example.

In one efficient embodiment, phase rotation elements 35a and 35b in FIG. 10d and FIG. 13, respectively, are implemented as low-loss high-frequency reactance circuits, so that they possess an optimal phase determined for this purpose at a predetermined frequency, so that a maximal value of diversity efficiency is obtained for all positions of the addressable signal selection switch 12, and of the phase selection switch 33, on the average. With this design, a surprising effect is found in that with this extremely efficient embodiment of the invention, a practically uniformly high value (4.7, in the example) for the diversity efficiency occurs, averaged over the entire frequency range, as with the system described above, with separately optimized phases for all pairs of combinations of the antennas with an arrangement according to FIG. 11 (4.8, in the example). In FIG. 16a, the progressions of the diversity efficiency are compared for the particularly cost-advantageous solution in curve 2, and for the system with separately optimized phases in curve 3. The phase progressions of the two phase rotation elements required for the implementation of curve 2 are shown in FIG. 16. The equivalence of these two systems, which have such different levels of complication, can be explained by the plurality of the directional diagrams that are available for selection in the summed output signals 8, at the output of the summation element 9, in the case of the different positions of the addressable signal selection switch 12 and phase selection switch 33. These directional diagrams can be documented in the antenna measurement field, with a rotating stand, at the output of the summation element 9 and therefore at receiver 1. The amounts of these directional diagrams are shown in FIG. 19, as already explained above. The useful signals that arrive from different azimuthal spatial directions, statistically, and the undesirable signals of an adjacent channel or an undesired same channel, respectively, which also arrive from different azimuthal spatial directions, statistically, are evaluated in terms of amount and phase by means of the directional diagram that corresponds to the position of signal selection switch 12 and phase selection switch 33, in each instance, and lead to a ratio of useful signal and interference signal at the output of summation element 9 (signal/noise ratio). It now turns out that viewed statistically, because of the plurality of the available directional diagrams, an advantageous position of the switches, with a high signal/noise ratio, can always be found, in such a manner that on the average, a similarly good diversity efficiency is obtained as with the more complicated system. None of the directional diagrams shown in FIG. 19 possesses even approximately the round characteristic that is always required for mobile reception in territories in which there is no interference due to multi-path reception. From the alternative availability of each of the diagrams shown, the system can select the most advantageous signal for each spatial direction, as needed, so that in the case of a measurement on the rotating stand, the azimuthal directional diagram shown in FIG. 18 can be documented, which practically represents a round diagram, with a single noteworthy indentation of 4 dB.

In the structuring of the multi-antenna system 2, it is advantageous if the directional diagrams of the antennas $A_1, A_2, \ldots A_N$ that can be measured at the inputs of the summation element 9 do not deviate from one another too much, on the azimuthal average. To prevent this deviation from becoming greater than 6 dB, for example, amplitude correction elements 36 can be introduced into the antennas $A_1, A_2, \ldots A_N$ (see FIG. 4) or into the antenna feed lines 2a. FIGS. 17a and b show directional diagrams with the same azimuthal average values, in terms of amount.

In another particularly advantageous embodiment of the invention, antenna amplifiers 21a, 21b are used, as they are described in connection with the arrangement in FIG. 6. The system is shown in FIG. 20 and functions according to the method that is described in connection with FIG. 10d. As a unique feature, with this design, transformation elements 29 in the two signal paths 15 and 16 are structured so that the necessary phase relationships occur at the inputs of summation element 9.

Accordingly, while several embodiments of the present invention have been shown and described, it is to be understood that many changes and modifications may be made thereunto without departing from the spirit and scope of the invention as defined in the appended claims.

What is claimed is:

1. An antenna diversity system for radio reception comprising:
   a) a receiver;
   b) a plurality of antennas;
   c) a plurality of antenna feed lines forming at least one input signal path coupled to said plurality of antennas;
   d) a high frequency line coupled to said receiver;
   e) an antenna diversity module disposed external to said receiver and coupled to said plurality of antenna feed lines and to said high frequency line, said antenna diversity module comprising:
      i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
      ii) a summation circuit having an output which is coupled to said receiver and has at least two inputs coupled to said first and second signal paths, wherein at least one switching device in said at least one addressable logic signal selection switch has at least an output coupled to said summation circuit;
      iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit;
   f) an evaluation circuit which evaluates a quality of the reception signal and which is in communication with said at least one addressable logic signal selection switch;
   wherein if an interference occurs in a summed signal, said at least one evaluation circuit detects said interference and signals said addressable logic signal selection switch to select a different coordinated setting of a switching position;
   said system further comprising an electronic control device having a memory, for coordinated setting of discrete phase rotation angles $\phi_i$ of said at least one phase rotation device wherein said angles are assigned in a fixed manner to a particular switching position of said addressable logic signal selection switch, and wherein each of said phase rotation angles are stored in a memory of said electronic control device as a phase vector, wherein a phase value matrix of discrete phase rotation angles $\phi_i$ is stored in said control device by way of said switching positions, wherein if interference occurs in a summed signal, an interference indicator signal of said evaluation circuit is passed to said electronic control device in the form of a different coordinated setting resulting in the selection of a different coordinated setting for said at least one addressable logic signal selection switch.

2. The antenna diversity system as in claim 1 wherein said discrete phase rotation angles are selected on the basis of a simulation calculation of a diversity efficiency in the Rayleigh reception scenario with regard to a set of greatest possible values in terms of diversity efficiency, and wherein there is a smallest number I of the different phase rotation angles $\phi_i$.

3. The antenna diversity system as in claim 2, wherein said at least one phase rotation device that can be set in a fixed manner is structured as a voltage-controlled phase rotation circuit that can be set in an analog manner, and wherein said control device having memory generates a voltage serving as a phase setting signal, wherein said signal is passed to said phase rotation circuit which is set in an analog manner, and which is used for setting a discrete phase rotation angle $\Phi_{a,b,l}$ that can be set in a fixed manner, wherein there is a related logic switching signal that is sent from said electronic control device for setting an assigned switching position (a=0, 1, 2, N, b=0, 1, 2, . . . N) of said addressable logic signal selection switch.

4. The antenna diversity system as in claim 3, wherein said at least one phase rotation device is designed as an addressable phase rotation circuit that can be set in a digital manner, and wherein said control device emits a phase setting signal that represents a logic address signal.

5. The antenna diversity system as in claim 1, wherein said plurality of antennas include active amplifier circuits for signal amplification and for uncoupling said antennas relative to one another, in view of load changes caused by switching, wherein said plurality of selection switches situated in said addressable logic signal selection switch are formed by switching diodes.

6. The antenna diversity system as in claim 1, further comprising a plurality of antenna amplifiers with a high impedance front end amplifier wherein at least one antenna amplifier is coupled to an input of said first output signal path, and at least one antenna amplifier is coupled to an input of said second output signal path, and wherein said antennas are configured as passive antennas.

7. The antenna diversity system as in claim 1, further comprising amplitude correction circuits which are coupled to said plurality of antennas or said plurality of antenna feed lines, wherein said antenna correction circuits are used to prevent relatively large deviations of azimuthal average values of radiation diagrams of said plurality of antennas.

8. The antenna diversity system as in claim 1, wherein said at least one phase rotation device is set in a fixed manner and is tied into said at least one input signal to rotate a phase angle of an antenna signal in at least one antenna feed line before said signal reaches said addressable logic selection switch.

9. The antenna diversity system as in claim 1, wherein said at least one phase rotation device disposed in said antenna diversity module, comprise circuits that change the phase of signals in said plurality of antennas and antenna feed lines.

10. An antenna diversity system for radio reception comprising:
a) a receiver;
b) a plurality of antennas;
c) a plurality of antenna feed lines forming at least one input signal path coupled to said plurality of antennas;
d) a high frequency line coupled to said receiver;
e) an antenna diversity module disposed external to said receiver and coupled to said plurality of antenna feed lines and to said high frequency line, said antenna diversity module comprising:
 i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
 ii) a summation circuit having an output which is coupled to said receiver and has at least two inputs coupled to said first and second signal paths, wherein at least one switching device in said at least one addressable logic signal selection switch has at least an output coupled to said summation circuit;
 iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit; and
f) an evaluation circuit which evaluates a quality of the reception signal and which is in communication with said at least one addressable logic signal selection switch,
wherein if an interference occurs in a summed signal, said at least one evaluation circuit detects said interference and signals said addressable logic signal selection switch to select a different coordinated setting of a switching position, and
wherein said phase rotation angle vector $\phi_i$ of said discrete phase rotation angles of said adjustable phase rotation device which is assigned to a specific switching position of said addressable signal selection switch, is formed from $I \leq 5$ different phase rotation angles $\phi_i$ having the same angle differences of $2\pi/1$.

11. An antenna diversity system for radio reception comprising:
a) a receiver;
b) a plurality of antennas;
c) a plurality of antenna feed lines forming at least one input signal path coupled to said plurality of antennas;
d) a high frequency line coupled to said receiver;
e) an antenna diversity module disposed external to said receiver and coupled to said plurality of antenna feed lines and to said high frequency line, said antenna diversity module comprising:
 i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
 ii) a summation circuit having an output which is coupled to said receiver and has at least two inputs coupled to said first and second signal paths, wherein at least one switching device in said at least one addressable logic signal selection switch has at least an output coupled to said summation circuit;
 iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit; and
f) an evaluation circuit which evaluates a quality of the reception signal and which is in communication with said at least one addressable logic signal selection switch,
wherein if an interference occurs in a summed signal, said at least one evaluation circuit detects said interference and signals said addressable logic signal selection switch to select a different coordinated setting of a switching position, and
wherein said antenna diversity module further comprises a diversity processor wherein said evaluation circuit for detecting reception quality transfers to an intermediate frequency signal from said receiver to said antenna diversity module, wherein said diversity processor provides for rapid recognition of interference, wherein said diversity processor creates an interference indicator signal for causing said addressable signal selection switch to set a different switching position (a=0, 1, 2, ... N, b=0, 1, 2, ... N) and said at least one adjustable phase rotation device to set a different discrete phase rotation angle $\Phi$.

12. The antenna diversity system as in claim 11, wherein said evaluation circuit and said diversity processor are both disposed in said receiver, wherein said interference indicator signal is coupled to said antenna diversity module and to said electronic control device having a memory.

13. The antenna diversity system as in claim 11, wherein said diversity processor has a logic processor having memory, wherein said evaluation circuit continuously detects an intensity and frequency of reception interference that occurs with the combinations of different switching positions of said at least one addressable logic signal selection switch, and a set of discrete phase angles $\Phi$a, b, I of said phase rotation device, wherein a priority list with regard to ranking, beginning with a combination that has the least interference is determined and continuously updated,
wherein a logic interference indicator signal is configured as a logic address selection signal for targeted selection of a combination of switching positions, and phase rotation angles $\Phi$ stored in said electronic control device, such that when interference occurs, said addressable signal selection switch switches to a different combination in a targeted manner, on the basis of a ranking formed, wherein said combination provides for the greatest probability of a lowest interference reception.

14. The antenna diversity system as in claim 13, wherein said diversity processor is disposed in said receiver, and wherein said receiver sends an address reception signal to said electronic control device in said antenna diversity module.

15. An antenna diversity system for radio reception comprising:
a) a receiver;
b) a plurality of antennas;
c) a plurality of antenna feed lines forming at least one input signal path coupled to said plurality of antennas;
d) a high frequency line coupled to said receiver;
e) an antenna diversity module disposed external to said receiver and coupled to said plurality of antenna feed lines and to said high frequency line, said antenna diversity module comprising:
i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
ii) a summation circuit having an output which is coupled to said receiver and has at least two inputs coupled to said first and second signal paths, wherein at least one switching device in said at least one addressable logic signal selection switch has at least an output coupled to said summation circuit;
iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit;
f) an evaluation circuit which evaluates a quality of the reception signal and which is in communication with said at least one addressable logic signal selection switch,
wherein if an interference occurs in a summed signal, said at least one evaluation circuit detects said interference and signals said addressable logic signal selection switch to select a different coordinated setting of a switching position; and
further comprising a plurality of antenna amplifiers with a high impedance front end amplifier wherein at least one antenna amplifier is coupled to an input of said first output signal path, and at least one antenna amplifier is coupled to an input of said second output signal path, and wherein said antennas are configured as passive antennas,
wherein at least one antenna amplifier comprises at least one transformation circuit wherein said at least one transformation circuit can be set in a logically addressable manner, and wherein said electronic control device forms at least one address control signal, wherein a related setting for compensation of a frequency response for at least one transformation circuit is initiated in said at least one antenna amplifier, when at least one of said plurality of antennas is switched on.

16. The antenna diversity system as in claim 15, wherein said plurality of antennas are configured as passive antennas, and comprise conductive structures disposed on a window of a vehicle, wherein the system further comprises a set of connectors of which are connected with said antenna diversity module which is disposed adjacent to the window, and wherein said high frequency line is for coupling said antenna diversity module to said receiver.

17. An antenna diversity system for radio reception comprising:
a) a receiver;
b) a plurality of antennas;
c) a plurality of antenna feed lines forming at least one input signal path coupled to said plurality of antennas;
d) a high frequency line coupled to said receiver;

e) an antenna diversity module disposed external to said receiver and coupled to said plurality of antenna feed lines and to said high frequency line, said antenna diversity module comprising:
  i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
  ii) a summation circuit having an output which is coupled to said receiver and has at least two inputs coupled to said first and second signal paths, wherein at least one switching device in said at least one addressable logic signal selection switch has at least an output coupled to said summation circuit;
  iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit;
f) an evaluation circuit which evaluates a quality of the reception signal and which is in communication with said at least one addressable logic signal selection switch,
wherein if an interference occurs in a summed signal, said at least one evaluation circuit detects said interference and signals said addressable logic signal selection switch to select a different coordinated setting of a switching position;
a level transmission setting device which is coupled to at least one of said first output signal path and said second output signal path; and
a level transmission value matrix for different discrete level transmission values (P a, b, I, j, where j=1, 2, . . . ) which is stored in said electronic control device having memory, wherein said matrix is for coordinating a setting of different discrete level transmission values for a combination of certain switching positions of said addressable signal selection switch, and a discrete phase rotation angle Φ, of said at least one phase rotation device and wherein there is a level transmission setting signal formed in said level transmission setting device.

18. An antenna diversity system for radio reception comprising:
  a) a receiver;
  b) a plurality of antennas;
  c) a plurality of antenna feed lines forming at least one input signal path coupled to said plurality of antennas;
  d) a high frequency line coupled to said receiver;
  e) an antenna diversity module disposed external to said receiver and coupled to said plurality of antenna feed lines and to said high frequency line, said antenna diversity module comprising:
    i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
    ii) a summation circuit having an output which is coupled to said receiver and has at least two inputs coupled to said first and second signal paths, wherein at least one switching device in said at least one addressable logic signal selection switch has at least an output coupled to said summation circuit;
    iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit; and
  f) an evaluation circuit which evaluates a quality of the reception signal and which is in communication with said at least one addressable logic signal selection switch,
  wherein if an interference occurs in a summed signal, said at least one evaluation circuit detects said interference and signals said addressable logic signal selection switch to select a different coordinated setting of a switching position, and
  wherein said at least one adjustable phase rotation device comprises at least two phase rotation circuits having phase angles set in a fixed manner, and wherein the device further comprises a controllable phase selection switch for an alternative selection of at lease one of the output signals of said phase rotation circuits, and wherein said control device generates a phase setting signal which is passed to said at least one phase rotation device that can be set in an analog manner for setting a discrete phase rotation angle Φ in each instance, and wherein said electronic control device also generates a logic switching signal for setting an assigned switching position, of said addressable logic signal selection switch.

19. the antenna diversity system as in claim 18, wherein said phase rotation device further comprises a multi-stage rotation circuit, coupled to a controllable phase selection switch wherein said multi-stage rotation circuit has a plurality of outputs which feed into said subsequent multi-stage selection switch.

20. The antenna diversity system as in claim 19, wherein said phase rotations which are formed from said multi-stage rotation circuit, are set so that at least two phases are optimized with regard to diversity efficiency and are available for pairs of combinations of said plurality of antennas.

21. The antenna diversity system as in claim 18, wherein said at least two phase rotation circuits, have phase angles set in a fixed manner, wherein said phase selection switch, is formed as a selective switch, wherein said phase angles are formed so that a greatest possible value of diversity efficiency is obtained for average values of all settings of said addressable signal selection switch and of said phase selection switch at a predetermined frequency.

22. The antenna diversity system as in claim 21, wherein said two phase circuits are designed as a low loss, high frequency reactance circuit and wherein a frequency dependence of their phases are structured to achieve diversity efficiency as great as possible at every frequency.

23. The antenna diversity system as in claim 22, further comprising at least one antenna amplifier having at least one high impedance front end amplifier on an input side and further comprising at least one transformation circuit, wherein at least one amplifier is disposed along said at least one first output signal path and at least one amplifier is disposed along said at least one second output signal path, so that a necessary phase ratio occurs at an input of said summation circuit.

24. The antenna diversity system as in claim 22, wherein said two phase rotation circuits comprise phase values of 0° and 180°; and wherein the system further comprises an inversion circuit; and a phase rotation circuit, wherein said phase rotation circuit determines a phase which is formed in a frequency dependent manner so that it creates a greatest possible antenna diversity.

25. An antenna diversity system for radio reception comprising:
   a) a receiver;
   b) a plurality of antennas;
   c) a plurality of antenna feed lines forming at least one input signal path coupled to said plurality of antennas;
   d) a high frequency line coupled to said receiver;
   e) an antenna diversity module disposed external to said receiver and coupled to said plurality of antenna feed lines and to said high frequency line, said antenna diversity module comprising:
      i) at least one addressable logic signal selection switch comprising at least two switching devices for a selection of different antenna reception signals, said at least two switching devices in the form of at least a first switching device having its output coupled to a first output signal path and at least a second switching device having its output coupled to a second output signal path;
      ii) a summation circuit having an output which is coupled to said receiver and has at least two inputs coupled to said first and second signal paths, wherein at least one switching device in said at least one addressable logic signal selection switch has at least an output coupled to said summation circuit;
      iii) at least one phase rotation device that is disposed along at least one of said signal paths, and is disposed between said at least one addressable logic signal selection switch and said summation circuit and is pre-set in phase angle rotation, in a fixed manner wherein a reception signal of one of said plurality of antennas is switched through to one of said at least two inputs on said summation circuit and wherein with at least one of a set of switch positions of said signal selection switch, the reception signal on another one of said plurality of antennas first passes through said at least one phase rotation device which is set in a fixed manner, and then is switched through another input of said at least two inputs on said summation circuit, and
   f) an evaluation circuit which evaluates a quality of the reception signal and which is in communication with said at least one addressable logic signal selection switch,
   wherein if an interference occurs in a summed signal, said at least one evaluation circuit detects said interference and signals said addressable logic signal selection switch to select a different coordinated setting of a switching position,
   wherein said at least one phase rotation device is set in a fixed manner and is tied into said at least one input signal to rotate a phase angle of an antenna signal in at least one antenna feed line before said signal reaches said addressable logic selection switch, and
   wherein when a plurality of antennas are present in the form of N number of antennas, said at least one phase rotation device is set in a fixed manner and tied to a plurality of antenna feed lines in the form of N-1 feed lines which are coupled to said at least one addressable logic signal selection switch, wherein said at least one phase rotation device is designed as a plurality of phase rotation devices and as a plurality of low loss high frequency reactance circuits, wherein a frequency dependence of their phase values results in a greatest possible diversity efficiency at every frequency and at each instance.

* * * * *